US012566314B2

(12) United States Patent
Yu et al.

(10) Patent No.: US 12,566,314 B2
(45) Date of Patent: Mar. 3, 2026

(54) CAMERA OPTICAL LENS

(71) Applicant: AAC Optics (Suzhou) Co., Ltd.,
Jiangsu (CN)

(72) Inventors: Renlong Yu, Suzhou (CN); Shunda Zhou, Suzhou (CN)

(73) Assignee: AAC Optics (Suzhou) Co., Ltd.,
Suzhou (CN)

( * ) Notice: Subject to any disclaimer, the term of this patent is extended or adjusted under 35 U.S.C. 154(b) by 305 days.

(21) Appl. No.: 18/393,563

(22) Filed: Dec. 21, 2023

(65) Prior Publication Data

US 2024/0345364 A1      Oct. 17, 2024

(30) Foreign Application Priority Data

Apr. 11, 2023    (CN) .......................... 202310377023.3

(51) Int. Cl.
*G02B 9/60*        (2006.01)
*G02B 13/00*       (2006.01)

(52) U.S. Cl.
CPC ........... *G02B 9/60* (2013.01); *G02B 13/0045* (2013.01)

(58) Field of Classification Search
None
See application file for complete search history.

(56) References Cited

U.S. PATENT DOCUMENTS 7,443,610 B1 * 10/2008 Lin ......................... G02B 13/22
                                                       359/740
2001/0022698 A1 *  9/2001 Sato ................... G02B 13/0045
                                                       359/733
2007/0229983 A1 * 10/2007 Saori .................... G02B 13/005
                                                       359/745
2013/0321932 A1 * 12/2013 Hsu .................... G02B 13/0045
                                                       359/714
2019/0331890 A1 * 10/2019 Fang ...................... G02B 1/041
2019/0331896 A1 * 10/2019 Fang ...................... G02B 13/18
2020/0409100 A1 * 12/2020 Bian ........................ G02B 9/64
2021/0364745 A1 * 11/2021 Wang ...................... G02B 9/62
2022/0382019 A1 * 12/2022 Ebe .................... G02B 13/0015

* cited by examiner

*Primary Examiner* — Darryl J Collins
(74) *Attorney, Agent, or Firm* — Wiersch Law Group

(57) ABSTRACT

The present disclosure relates to the technical field of optical lens and discloses a camera optical lens. The camera optical lens includes, from an object side to an image side: a first lens having a positive refractive power, a second lens having a positive refractive power, a third lens having a negative refractive power, a fourth lens having a positive refractive power, a fifth lens having a refractive power; the first lens and the fourth lens being glass; wherein the camera optical lens satisfies following conditions: 1.70≤n1≤2.20, 0.10≤R5/R6≤0.90, 0.75≤f4/f≤1.55 and 0.60≤d2/d3≤3.00. The camera optical lens has good optical functions, while satisfying a design requirement of large aperture and fine temperature performance.

10 Claims, 10 Drawing Sheets

10

10

Longitudinal aberration mm

20

50

Longitudinal aberration mm

CAMERA OPTICAL LENS

TECHNICAL FIELD

The present disclosure relates to the field of optical lens, in particular, to a camera optical lens suitable for handheld devices, such as smart phones and digital cameras, and imaging devices, such as monitors, PC lenses or vehicle-mounted lenses.

BACKGROUND

With the emergence of various smart devices in recent years, the demand for miniature camera optical lens is increasing day by day, and as the pixel size of the photosensitive devices become smaller, plus the current development trend of electronic products towards better functions and thinner and portable dimensions, miniature camera optical lens with good imaging quality therefore have become a mainstream in the market. In order to obtain better imaging quality, the lens generally adopts a multi-piece lens structure. Also, with the development of technology and the increase of the diverse demands of users, and as the pixel area of photosensitive devices is becoming smaller and smaller and the requirement of the system on the imaging quality is improving constantly, the five-piece lens structure gradually appear in lens designs. There is an urgent need for long-focal-length camera lenses with outstanding optical characteristics, small size and fully corrected aberration.

SUMMARY

To address the above issues, the present disclosure seeks to provide a camera optical lens that satisfies a design requirement of large aperture and fine temperature performance while having good optical functions.

In order to address the above issues, embodiments of the present disclosure provide a camera optical lens including, from an object side to an image side: a first lens having a positive refractive power; a second lens having a positive refractive power; a third lens having a negative refractive power; a fourth lens having a positive refractive power; and a fifth lens having a refractive power; the first lens and the fourth lens being glass; wherein the camera optical lens satisfies following conditions: $1.70 \leq n1 \leq 2.20$; $0.10 \leq R5/R6 \leq 0.90$; $0.75 \leq f4/f \leq 1.55$; and $0.60 \leq d2/d3 \leq 3.00$, where n1 denotes a refractive index of the first lens, R5 denotes a central curvature radius of an object-side surface of the third lens; R6 denotes a central curvature radius of an image-side surface of the third lens; f denotes a focal length of the camera optical lens; f4 denotes a focal length of the fourth lens; d2 denotes an on-axis distance from an image-side surface of the first lens to an object-side surface of the second lens; and d3 denotes an on-axis thickness of the second lens.

As an improvement, the camera optical lens further satisfies following condition: $0.90 \leq R9/d9 \leq 4.00$; where R9 denotes a central curvature radius of the object-side surface of the fifth lens; and d9 denotes an on-axis thickness of the fifth lens.

As an improvement, the camera optical lens further satisfies following condition: $1.70 \leq n4 \leq 2.20$; where n4 denotes a refractive index of the fourth lens.

As an improvement, an operation wavelength of the camera optical lens is 805 nm to 975 nm.

As an improvement, an operation temperature range of the camera optical lens is −40° C. to 85° C.

As an improvement, an object-side surface of the first lens is convex in a paraxial region and the image-side surface of the first lens is concave in the paraxial region; and the camera optical lens further satisfies following conditions: $1.14 \leq f1/f \leq 4.89$; $-5.14 \leq (R1+R2)/(R1-R2) \leq -1.05$; and $0.02 \leq d1/TTL \leq 0.19$; where f1 denotes a focal length of the first lens; R1 denotes a central curvature radius of the object-side surface of the first lens; R2 denotes a central curvature radius of the image-side surface of the first lens; d1 denotes an on-axis thickness of the first lens; and TTL denotes a total optical length from the object-side surface of the first lens to an image surface of the camera optical lens along an optical axis.

As an improvement, an object-side surface of the second lens is convex in a paraxial region and an image-side surface of the second lens is concave in the paraxial region; and the camera optical lens further satisfies following conditions: $1.36 \leq f2/f \leq 6.40$; $-6.45 \leq (R3+R4)/(R3-R4) \leq -1.05$; and $0.02 \leq d3/TTL \leq 0.06$; where f2 denotes a focal length of the second lens; R3 denotes a central curvature radius of the object-side surface of the second lens; R4 denotes a central curvature radius of the image-side surface of the second lens; and TTL denotes a total optical length from an object-side surface of the first lens to an image surface of the camera optical lens along an optical axis.

As an improvement, the object-side surface of the third lens is concave in a paraxial region and the image-side surface of the third lens is convex in the paraxial region; and the camera optical lens further satisfies following conditions: $-5.98 \leq f3/f \leq -0.49$; $-16.58 \leq (R5+R6)/(R5-R6) \leq -0.82$; and $0.02 \leq d5/TTL \leq 0.07$; where f3 denotes a focal length of the third lens; d5 denotes an on-axis thickness of the third lens; and TTL denotes a total optical length from an object-side surface of the first lens to an image surface of the camera optical lens along an optical axis.

As an improvement, an object-side surface of the fourth lens is convex in a paraxial region and an image-side surface of the fourth lens is convex in the paraxial region; and the camera optical lens further satisfies following conditions: $-1.00 \leq (R7+R8)/(R7-R8) \leq 1.45$; and $0.07 \leq d7/TTL \leq 0.28$; where R7 denotes a central curvature radius of the object-side surface of the fourth lens; R8 denotes a central curvature radius of the image-side surface of the fourth lens; d7 denotes an on-axis thickness of the fourth lens; and TTL denotes a total optical length from an object-side surface of the first lens to an image surface of the camera optical lens along an optical axis.

As an improvement, an object-side surface of the fifth lens is convex in a paraxial region and an image-side surface of the fifth lens is concave in the paraxial region, and the camera optical lens further satisfies following conditions: $-9.16 \leq f5/f \leq 6.22$; $-16.54 \leq (R9+R10)/(R9-R10) \leq 137.13$; and $0.03 \leq d9/TTL \leq 0.31$; where f5 denotes a focal length of the fifth lens; R9 denotes a central curvature radius of the object-side surface of the fifth lens; R10 denotes a central curvature radius of the image-side surface of the fifth lens; d9 denotes an on-axis thickness of the fifth lens; and TTL denotes a total optical length from an object-side surface of the first lens to an image surface of the camera optical lens along an optical axis.

The present disclosure is advantageous in: the camera optical lens according to the present disclosure has outstanding optical characteristics, has characteristics of large aperture and fine temperature performance, and is especially fit for a vehicle-mounted camera optical lens component and a WEB camera lens composed by such camera elements as a charge coupled device (CCD) and a complementary metal oxide semiconductor (CMOS) for high pixels.

BRIEF DESCRIPTION OF DRAWINGS

In order to illustrate the technical solutions in the embodiments of the present disclosure more clearly, the drawings used in the description of the embodiments will be briefly described below. It is obvious that the drawings in the following description are only some embodiments of the present disclosure. For those skilled in the art, other drawings may also be obtained in accordance with the drawings without any inventive effort.

DETAILED DESCRIPTION OF EMBODIMENTS

To make the objects, technical solutions, and advantages of the present disclosure clearer, embodiments of the present disclosure are described in detail with reference to accompanying drawings in the following. A person of ordinary skill in the art can understand that, in the embodiments of the present disclosure, many technical details are provided to make readers better understand the present disclosure. However, even without these technical details and any changes and modifications based on the following embodiments, technical solutions required to be protected by the present disclosure can be implemented.

Embodiment 1

Figure 1:
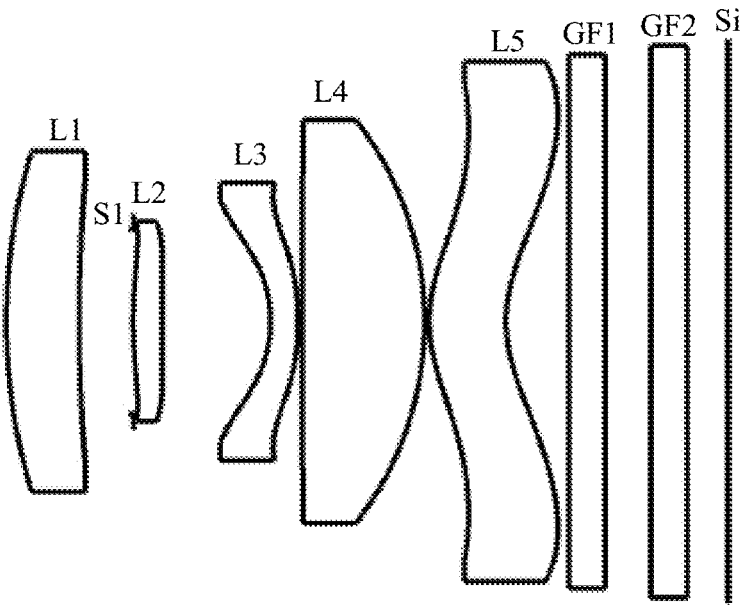
FIG. 1 is a schematic diagram of a structure of a camera optical lens according to Embodiment 1 of the present disclosure.

Referring to the accompanying drawings, the present disclosure provides a camera optical lens 10. FIG. 1 shows the camera optical lens 10 of Embodiment 1 of the present disclosure, and the camera optical lens 10 includes five lenses. Specifically, the camera optical lens 10 includes, from an object side to an image side: a first lens L1, an aperture S1, a second lens L2, a third lens L3, a fourth lens L4 and a fifth lens L5. An optical element such as an optical filter GF can be arranged between the fifth lens L5 and an image surface Si. In this embodiment, two filters GF1 and GF2 are included.

In this embodiment, the first lens L1 is glass, the second lens L2 is plastic, the third lens L3 is plastic, the fourth lens L4 is glass and the fifth lens L5 is plastic. A proper selection of a glass lens may improve optical functions of the camera optical lens 10, while enabling a system to operate stably under extremely cold or hot operation temperatures, so as to guarantee outstanding imaging quality. In an alternative embodiment, the lenses may be other materials.

Object-side surfaces and image-side surfaces of the first lens L1 and fourth lens L4 are spherical surfaces, while the rest lenses are aspherical-surface lenses. Manufacturing difficulty may be reduced by designing surfaces of some lenses as spheres.

A refractive index of the first lens L1 is defined as $n1$, and the camera optical lens 10 satisfies a condition of $1.70 \leq n1 \leq 2.20$, which specifies a range of the refractive index of the first lens L1. Within this range, chromatic aberration may effectively be corrected.

In an embodiment, a central curvature radius of an object-side surface of the third lens L3 is defined as $R5$, a central curvature radius of the image-side surface of the third lens L3 is defined as $R6$, and the camera optical lens 10 further satisfies a condition of $0.10 \leq R5/R6 \leq 0.90$, which specifies a shape of the third lens L3, mitigates deflection of light passing the lens, and effectively corrects chromatic aberration so that the chromatic aberration satisfies a condition of $|LC| \leq 1.2\ \mu m$.

A focal length of the camera optical lens 10 is defined as $f$, a focal length of the fourth lens L4 is defined as $f4$, and the camera optical lens 10 satisfies a condition of $0.75 \leq f4/f \leq 1.55$, which specifies a ratio of the focal length $f4$ of the fourth lens L4 and the focal length $f$ of the camera optical lens 10. Within this range, field curvatures of the system may effectively be balanced so that a field curvature offset of a central field is less than 0.02 mm.

An on-axis distance from an image-side surface of the first lens L1 to an object-side surface of the second lens L2 is defined as $d2$, an on-axis thickness of the second lens L2 is defines as $d3$, and the camera optical lens 10 satisfies a condition of $0.60 \leq d2/d3 \leq 3.00$, which specifies a ratio of the on-axis distance $d2$ from the image-side surface of the first lens L1 to the object-side surface of the second lens L2 and the on-axis thickness $d3$ of the second lens L2. This range facilitates shortening a total length of the camera optical lens 10.

A central curvature radius of the object-side surface of the fifth lens L5 is defined as $R9$, an on-axis thickness of the fifth lens L5 is defined as $d9$, and the camera optical lens 10 further satisfies a condition of $0.90 \leq R9/d9 \leq 4.00$ which specifies a ratio of the central curvature radius R9 of the object-side surface of the fifth lens L5 and the on-axis thickness d9 of the fifth lens L5. The condition facilitates the fifth lens L5 correcting an off-axis aberration of an image-side end, while shortening a total optical length of the camera optical lens 10 to achieve miniaturization.

A refractive index of the fourth lens L4 is defined as n4, and the camera optical lens 10 satisfies a condition of $1.70 \leq n4 \leq 2.20$ which specifies a range of the refractive index of the fourth lens L4. This range may effectively correct chromatic aberration.

An operation wavelength of the camera optical lens 10 is 805 nm to 975 nm. An operation temperature range of the camera optical lens 10 is $-40°$ C. to $85°$ C.

In an embodiment, the object-side surface of the first lens L1 is convex in a paraxial region, and an image-side surface of the first lens L1 is concave in the paraxial region. The first lens L1 has a positive refractive power. In an alternative embodiment, the object-side surface and the image-side surface of the first lens L1 may be set as other distribution conditions of concave and convex surfaces.

A focal length of the first lens L1 is defined as f1, and the camera optical lens 10 satisfies a condition of $1.14 \leq f1/f \leq 4.89$, which specifies a ratio of the focal length f1 of the first lens L1 and the focal length f of the camera optical lens 10. This range facilitates achieving ultra-wide-angle lenses. Preferably, the camera optical lens 10 satisfies a condition of $1.82 \leq f1/f \leq 3.91$.

A central curvature radius of the object-side surface of the first lens L1 is defined as R1, a central curvature radius of the image-side surface of the first lens L1 is defined as R2, and the camera optical lens 10 satisfies a condition of $-5.14 \leq (R1+R2)/(R1-R2) \leq -1.05$ which specifies a shape of the first lens L1. This range facilitates achieving ultra-wide angle. Preferably, the camera optical lens 10 satisfies a condition of $-3.21 \leq (R1+R2)/(R1-R2) \leq -1.31$.

An on-axis thickness of the first lens L1 is defined as d1, a total optical length of the camera optical lens 10 from the object-side surface of the first lens to an image surface of the camera optical lens along an optical axis is defined as TTL, and the camera optical lens 10 satisfies a condition of $0.02 \leq d1/TTL \leq 0.19$. This range facilitates achieving miniaturization. Preferably, the camera optical lens 10 satisfies a condition of $0.03 \leq d1/TTL \leq 0.15$.

In an embodiment, an object-side surface of the second lens L2 is convex in the paraxial region, an image-side surface of the second lens L2 is concave in the paraxial region, and the second lens L2 has a positive refractive power. In an alternative embodiment, the object-side surface and image-side surface of the second lens L2 may be set as other distribution conditions of concave and convex surfaces.

In this embodiment, a focal length of the second lens L2 is defined as f2, and the camera optical lens 10 further satisfies a condition of $1.36 \leq f2/f \leq 6.40$ which specifies a ratio of the focal length f2 of the second lens L2 and the focal length f of the camera optical lens 10. Within this range, field curvatures of the system may effectively be balanced. Preferably, the camera optical lens 10 further satisfies a condition of $2.17 \leq f2/f \leq 5.12$.

A central curvature radius of the object-side surface of the second lens L2 is defined as R3, a central curvature radius of the image-side surface of the second lens L2 is defined as R4, and the camera optical lens 10 further satisfies a condition of $-6.45 \leq (R3+R4)/(R3-R4) \leq -1.05$, which specifies a shape of the second lens L2. This range facilitates mitigating deflection of light passing the lens, and reducing sensitivity of the camera optical lens 10. Preferably, the camera optical lens 10 satisfies a condition of $-4.03 \leq (R3+R4)/(R3-R4) \leq -1.31$.

The second lens L2 further satisfies a condition of $0.02 \leq d3/TTL \leq 0.06$. This can facilitate achieving miniaturization. Preferably, the second lens L2 satisfies a condition of $0.03 \leq d3/TTL \leq 0.05$.

In an embodiment, an object-side surface of the third lens L3 is concave in the paraxial region, an image-side surface of the third lens L3 is convex in the paraxial region, and the third lens L3 has a negative refractive power. In an alternative embodiment, the object-side surface and image-side surface of the third lens L3 may be set as other distribution conditions of concave and convex surfaces.

A focal length of the third lens L3 is defined as f3, and the camera optical lens 10 further satisfies a condition of $-5.98 \leq f3/f \leq -0.49$. An appropriate distribution of the refractive power leads to a better imaging quality and a lower sensitivity of the system. Preferably, the camera optical lens 10 further satisfies a condition of $-3.74 \leq f3/f \leq -0.61$.

The third lens L3 further satisfies a condition of $-16.58 \leq (R5+R6)/(R5-R6) \leq -0.82$ which specifies a shape of the third lens L3. This range can mitigate deflection of light and effectively correct chromatic aberration. Preferably, camera lens 10 optical satisfies a condition of $-10.36 \leq (R5+R6)/(R5-R6) \leq -1.03$.

An on-axis thickness of the third lens L3 is defined as d5, and the camera optical lens 10 further satisfies a condition of $0.02 \leq d5/TTL \leq 0.07$. This range facilitates achieving miniaturization. Preferably, the camera optical lens 10 satisfies a condition of $0.03 \leq d5/TTL \leq 0.05$.

In an embodiment, an object-side surface of the fourth lens L4 is convex in the paraxial region, an image-side surface of the fourth lens L4 is convex in the paraxial region, and the fourth lens L4 has a positive refractive power. In an alternative embodiment, the object-side surface and image-side surface of the fourth lens L4 may be set as other distribution conditions of concave and convex surfaces.

A central curvature radius of the object-side surface of the fourth lens L4 is defined as R7, a central curvature radius of the image-side surface of the fourth lens L4 is defined as R8, and the camera optical lens 10 satisfies a condition of $-1.00 \leq (R7+R8)/(R7-R8) \leq 1.45$ which specifies a shape of the fourth lens L4. This range facilitates correcting astigmatism and distortion of the camera optical lens 10, so that $|Distortion| \leq 35.0\%$, which reduces a possibility of vignetting. Preferably, the camera optical lens 10 satisfies a condition of $-0.63 \leq (R7+R8)/(R7-R8) \leq 1.16$.

An on-axis thickness of the fourth lens L4 is defined as d7, and the camera optical lens 10 satisfies a condition of $0.07 \leq d7/TTL \leq 0.28$. This range facilitates achieving miniaturization. Preferably, the camera optical lens 10 satisfies a condition of $0.12 \leq d7/TTL \leq 0.22$.

In an embodiment, an object-side surface of the fifth lens L5 is convex in the paraxial region, an image-side surface of the fifth lens L5 is concave in the paraxial region, and the fifth lens L5 has a positive refractive power. In an alternative embodiment, the object-side surface and image-side surface of the fifth lens L5 may be set as other distribution conditions of concave and convex surfaces. The fifth lens L5 may have a negative refractive power.

A focal length of the fifth lens L5 is defined as f5, and the camera optical lens 10 further satisfies a condition of $-9.16 \leq f5/f \leq 6.22$. The definition on the fifth lens L5 may effectively make light angle of the camera optical lens 10 mild and reduce tolerance sensitivity. Preferably, the camera optical lens 10 satisfies a condition of $-5.72 \leq f5/f \leq 4.97$.

A central curvature radius of the image-side surface of the fifth lens L5 is defined as R10, and the camera optical lens 10 further satisfies a condition of −16.54≤(R9+R10)/(R9−R10)≤137.13, which specifies a shape of the fifth lens L5. This range facilitates correcting astigmatism and distortion of the camera optical lens 10 and reducing a possibility of vignetting. Preferably, the camera optical lens 10 further satisfies a condition of −10.34≤(R9+R10)/(R9−R10)≤109.71.

The fifth lens L5 further satisfies a condition of 0.03≤d9/TTL≤0.31. This range facilitates achieving miniaturization. Preferably, the camera optical lens 10 satisfies a condition of 0.06≤d9/TTL≤0.25.

In this embodiment, an field of view in a diagonal direction of the camera optical lens 10 is FOV, and the camera optical lens 10 satisfies a condition of FOV≥65.89°, which facilitate achieving wide angle. Preferably, the camera optical lens 10 satisfies a condition of FOV≥66.56°.

In this embodiment, an image height of the camera optical lens 10 is IH, and the camera optical lens 10 satisfies a condition of TTL/IH≤2.77, which facilitates achieving miniaturization. Preferably, the camera optical lens 10 satisfies a condition of TTL/IH≤2.69.

In this embodiment, an F number of the camera optical lens 10 is FNO which is less than or equal to 2.10. Thus, the camera optical lens 10 has a large aperture and a better imaging performance.

The camera optical lens 10 has good optical functions, while satisfying a design requirement of large aperture, wide angle and ultra-thinness. According to characteristics of the camera optical lens 10, the camera optical lens 10 is especially fit for a vehicle-loaded lens, a mobile phone camera optical lens component and a WEB camera lens composed by such camera elements as a charge coupled device (CCD) and a complementary metal oxide semiconductor (CMOS) for high pixels.

In the following, examples will be used to describe the camera optical lens 10 of the present disclosure. The symbols recorded in each example will be described as follows. The focal length, on-axis distance, central curvature radius, on-axis thickness, inflexion point position, and arrest point position are all in units of mm.

TTL: Total optical length (on-axis distance from the object-side surface of the first lens L1 to the image surface Si) of the camera optical lens 10 in mm.

F number FNO: A ratio of an effective focal length of the camera optical length and an entrance pupil diameter.

Preferably, inflexion points and/or arrest points can be arranged on the object-side surface and/or the image-side surface of the lens, so as to satisfy the demand for high-quality imaging. The description below can be referred for specific implementations.

The design data of the camera optical lens 10 in Embodiment 1 of the present disclosure are shown in Table 1 and Table 2.

TABLE 1

| | R | | d | | nd | | vd | |
|---|---|---|---|---|---|---|---|---|
| S1 | ∞ | d0= | −1.409 | | | | | |
| R1 | 6.370 | d1= | 0.808 | nd1 | 1.8830 | v1 | 39.23 | |
| R2 | 18.899 | d2= | 0.593 | | | | | |
| R3 | 4.901 | d3= | 0.319 | nd2 | 1.6613 | v2 | 20.37 | |
| R4 | 11.351 | d4= | 1.200 | | | | | |
| R5 | −1.532 | d5= | 0.300 | nd3 | 1.6613 | v3 | 20.37 | |
| R6 | −4.116 | d6= | 0.050 | | | | | |
| R7 | 217.745 | d7= | 1.352 | nd4 | 1.8348 | v4 | 42.73 | |

TABLE 1-continued

| | R | | d | | nd | | vd | |
|---|---|---|---|---|---|---|---|---|
| R8 | −3.625 | d8= | 0.051 | | | | | |
| R9 | 1.557 | d9= | 0.847 | nd5 | 1.5370 | v5 | 55.98 | |
| R10 | 1.519 | d10= | 0.700 | | | | | |
| R11 | ∞ | d11= | 0.400 | ndg1 | 1.5233 | vg1 | 54.52 | |
| R12 | ∞ | d12= | 0.500 | | | | | |
| R13 | ∞ | d13= | 0.400 | ndg2 | 1.5168 | vg2 | 64.17 | |
| R14 | ∞ | d14= | 0.457 | | | | | |

In the table, meanings of various symbols will be described as follows.

S1: aperture;

R: curvature radius at a center an optical surface;

R1: central curvature radius of the object-side surface of the first lens L1;

R2: central curvature radius of the image-side surface of the first lens L1;

R3: central curvature radius of the object-side surface of the second lens L2;

R4: central curvature radius of the image-side surface of the second lens L2;

R5: central curvature radius of the object-side surface of the third lens L3;

R6: central curvature radius of the image-side surface of the third lens L3;

R7: central curvature radius of the object-side surface of the fourth lens L4;

R8: central curvature radius of the image-side surface of the fourth lens L4;

R9: central curvature radius of the object-side surface of the fifth lens L5;

R10: central curvature radius of the image-side surface of the fifth lens L5;

R11: central curvature radius of an object-side surface of an optical filter GF1;

R12: central curvature radius of an image-side surface of the optical filter GF1;

R13: central curvature radius of an object-side surface of an optical filter GF2;

R14: central curvature radius of an image-side surface of the optical filter GF2;

d: on-axis thickness of a lens and an on-axis distance between lenses;

d0: on-axis distance from the aperture S1 to the object-side surface of the first lens L1;

d1: on-axis thickness of the first lens L1;

d2: on-axis distance from the image-side surface of the first lens L1 to the object-side surface of the second lens L2;

d3: on-axis thickness of the second lens L2;

d4: on-axis distance from the image-side surface of the second lens L2 to the object-side surface of the third lens L3;

d5: on-axis thickness of the third lens L3;

d6: on-axis distance from the image-side surface of the third lens L3 to the object-side surface of the fourth lens L4;

d7: on-axis thickness of the fourth lens L4;

d8: on-axis distance from the image-side surface of the fourth lens L4 to the object-side surface of the fifth lens L5;

d9: on-axis thickness of the fifth lens L5;

d10: on-axis distance from the image-side surface of the fifth lens L5 to the object-side surface of the optical filter GF;

d11: on-axis thickness of the optical filter GF1;

d12: on-axis distance from the image-side surface of the optical filter GF1 to the optical filter GF2;

d13: on-axis thickness of the optical filter GF2;

d14: on-axis distance from the image-side surface to the image surface Si of the optical filter GF2;

nd: refractive index of the d line (the d line is a green light having a wavelength of 905 nm);

nd1: refractive index of the d line of the first lens L1;

nd2: refractive index of the d line of the second lens L2;

nd3: refractive index of the d line of the third lens L3;

nd4: refractive index of the d line of the fourth lens L4;

nd5: refractive index of the d line of the fifth lens L5;

ndg1: refractive index of the d line of the optical filter GF1;

ndg2: refractive index of the d line of the optical filter GF2;

vd: abbe number;

v1: abbe number of the first lens L1;

v2: abbe number of the second lens L2;

v3: abbe number of the third lens L3;

v4: abbe number of the fourth lens L4;

v5: abbe number of the fifth lens L5;

vg1: abbe number of the optical filter GF1;

vg2: abbe number of the optical filter GF2.

Table 2 shows aspherical surface data of the camera optical lens 10 in Embodiment 1 of the present disclosure.

TABLE 2

| | Conic coefficient | Aspherical surface coefficients | | | | |
|---|---|---|---|---|---|---|
| | k | A4 | A6 | A8 | A10 | A12 |
| R3 | −1.0763E+02 | 8.1651E−02 | −2.8951E−01 | 7.3154E−01 | −1.6630E+00 | 2.7129E+00 |
| R4 | −2.4276E+02 | −2.5239E−02 | −1.1712E−01 | 4.0778E−01 | −1.1011E+00 | 1.8508E+00 |
| R5 | −1.1129E+01 | −5.6815E−01 | 9.9285E−01 | −1.4201E+00 | 1.5841E+00 | −1.1978E+00 |
| R6 | −1.9412E+01 | −2.9938E−01 | 4.4532E−01 | −4.8978E−01 | 4.2895E−01 | −2.5595E−01 |
| R9 | −5.3816E+00 | 1.6891E−02 | −4.2634E−02 | 2.4824E−02 | −8.4817E−03 | 1.8726E−03 |
| R10 | −1.9237E+00 | −5.5422E−02 | 9.8642E−03 | −1.7262E−04 | −4.1643E−04 | 1.0865E−04 |

| | Conic coefficient | Aspherical surface coefficients | | | |
|---|---|---|---|---|---|
| | k | A14 | A16 | A18 | A20 |
| R3 | −1.0763E+02 | −2.9631E+00 | 2.0278E+00 | −7.8040E−01 | 1.2802E−01 |
| R4 | −2.4276E+02 | −1.9334E+00 | 1.2158E+00 | −4.1897E−01 | 6.0237E−02 |
| R5 | −1.1129E+01 | 5.7671E−01 | −1.6491E−01 | 2.4347E−02 | −1.2916E−03 |
| R6 | −1.9412E+01 | 9.8150E−02 | −2.3006E−02 | 2.9700E−03 | −1.6011E−04 |
| R9 | −5.3816E+00 | −2.6893E−04 | 2.4262E−05 | −1.2512E−06 | 2.8186E−08 |
| R10 | −1.9237E+00 | −1.3852E−05 | 9.8077E−07 | −3.6622E−08 | 5.6025E−10 |

For convenience, an aspherical surface of each lens surface is an aspherical surface shown in the below formula (1). However, the present disclosure is not limited to the aspherical polynomials form shown in the formula (1).

$$z = (cr^2)/\left\{1 + \left[1 - (k+1)(c^2r^2)\right]^{1/2}\right\} + A4r^4 + A6r^6 + \\ A8r^8 + A10r^{10} + A12r^{12} + A14r^{14} + A16r^{16} + A18r^{18} + A20r^{20} \quad (1)$$

Herein, k is a conic coefficient, A4, A6, A8, A10, A12, A14, A16, A18 and A20 are aspherical surface coefficients, c is a curvature at a center of the optical surface, r is a vertical distance from a point on an aspherical surface curve to the optical axis, and z is an aspherical surface depth (a vertical distance between a point on the aspherical surface which is of the distance of r from the optical axis, and a tangent surface that is tangent with a top point of the optical axis of the aspherical surface).

Table 3 and Table 4 show design data of inflexion points and arrest points of lenses of the camera optical lens 10 according to Embodiment 1 of the present disclosure. Herein, P1R1 and P1R2 respectively represent the object-side surface and the image-side surface of the first lens L1. P2R1 and P2R2 respectively represent the object-side surface and the image-side surface of the second lens L2. P3R1 and P3R2 respectively represent the object-side surface and the image-side surface of the third lens L3. P4R1 and P4R2 respectively represent the object-side surface and the image-side surface of the fourth lens L4. P5R1 and P5R2 respectively represent the object-side surface and the image-side surface of the fifth lens L5. The data in the column named "inflexion point position" refer to vertical distances from inflexion points arranged on each lens surface to the optic axis of the camera optical lens 10. The data in the column named "arrest point position" refer to vertical distances from arrest points arranged on each lens surface to the optic axis of the camera optical lens 10.

TABLE 3

| | Inflexion point number | Inflexion point position 1 |
|---|---|---|
| P1R1 | 0 | / |
| P1R2 | 0 | / |

TABLE 3-continued

| | Inflexion point number | Inflexion point position 1 |
|---|---|---|
| P2R1 | 1 | 0.585 |
| P2R2 | 1 | 0.355 |
| P3R1 | 1 | 0.955 |
| P3R2 | 1 | 0.915 |
| P4R1 | 0 | / |
| P4R2 | 0 | / |
| P5R1 | 1 | 0.875 |
| P5R2 | 1 | 0.995 |

TABLE 4

| | Arrest point number | Arrest point position 1 |
|---|---|---|
| P1R1 | 0 | / |
| P1R2 | 0 | / |
| P2R1 | 1 | 0.915 |
| P2R2 | 1 | 0.595 |
| P3R1 | 0 | / |
| P3R2 | 1 | 1.385 |
| P4R1 | 0 | / |
| P4R2 | 0 | / |
| P5R1 | 1 | 2.115 |
| P5R2 | 1 | 2.275 |

Figure 2:
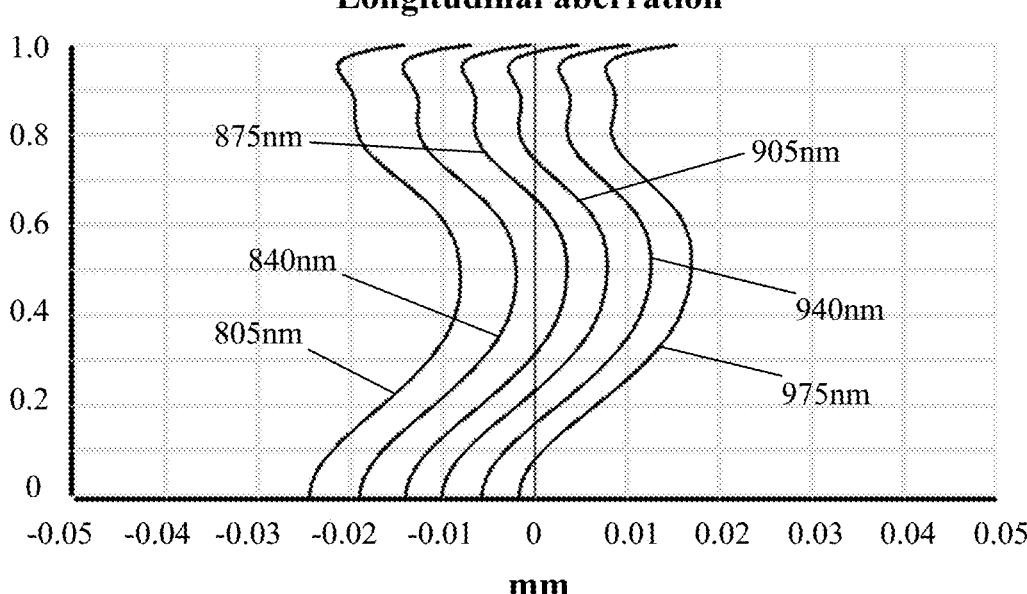
FIG. 2 is a schematic diagram of a longitudinal aberration of the camera optical lens shown in FIG. 1.
Figure 3:
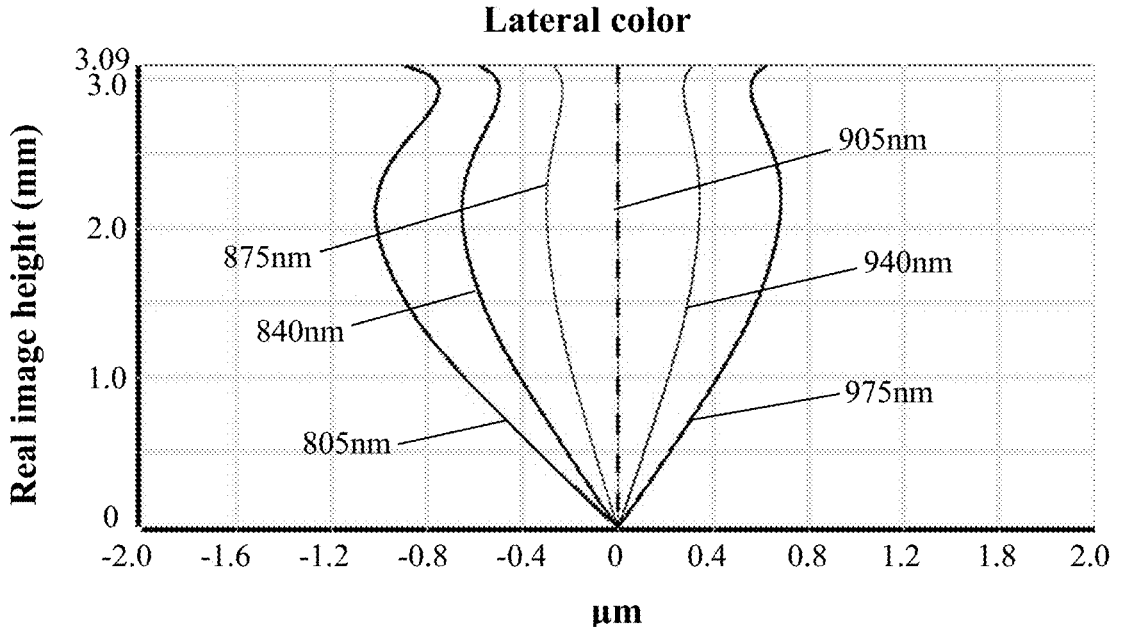
FIG. 3 is a schematic diagram of a lateral color of the camera optical lens shown in FIG. 1.
Figure 4:
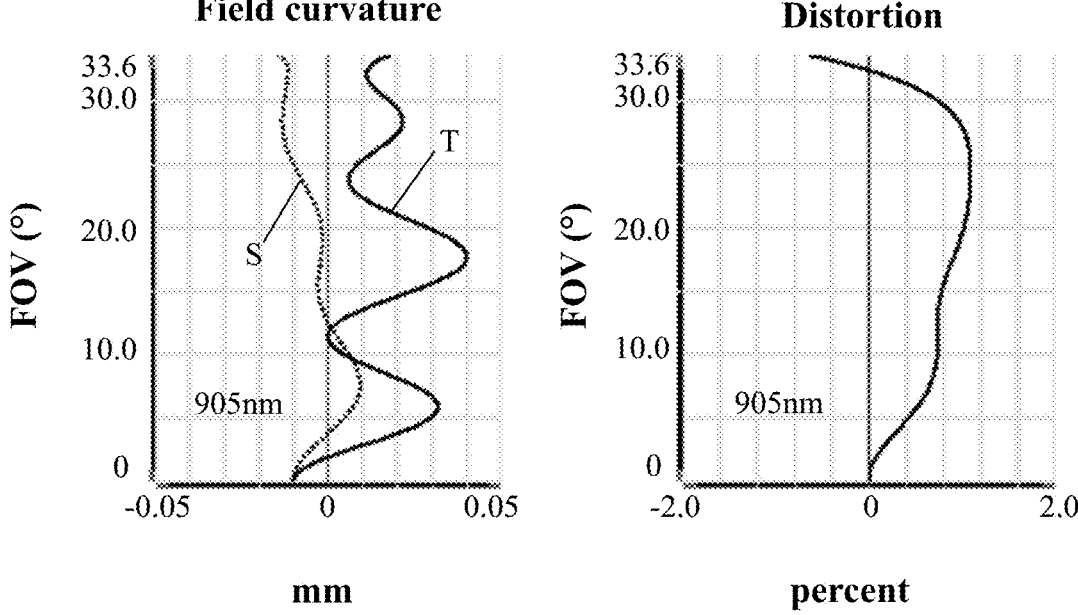
FIG. 4 is a schematic diagram of a field curvature and a distortion of the camera optical lens shown in FIG. 1.

FIG. 2 and FIG. 3 illustrate a longitudinal aberration and a lateral color with wavelengths of 805 nm, 840 nm, 875 nm, 905 nm, 940 nm and 975 nm after passing the camera optical lens 10 according to Embodiment 1, respectively. FIG. 4 illustrates a field curvature and a distortion with a wavelength of 905 nm after passing the camera optical lens 10 according to Embodiment 1. A field curvature S in FIG. 4 is a field curvature in a sagittal direction, and T is a field curvature in a tangential direction.

Table 21 in the following shows various values of the embodiments and values corresponding to parameters which are specified in the conditions.

As shown in Table 21, Embodiment 1 satisfies the conditions.

In an embodiment, an entrance pupil diameter ENPD of the camera optical lens 10 is 2.268 mm, an image height IH of 1.0H is 3.0925 mm, and an FOV (field of view) in a diagonal direction is 67.23°. Thus, the camera optical lens 10 satisfies a design requirement of large aperture, ultra-thinness and fine temperature performance. Its on-axis and off-axis aberrations are fully corrected, thereby having excellent optical characteristics.

Embodiment 2

Embodiment 2 is basically the same as Embodiment 1 and involves symbols having the same meanings as Embodiment 1, and only differences therebetween will be described in the following.

Figure 5:
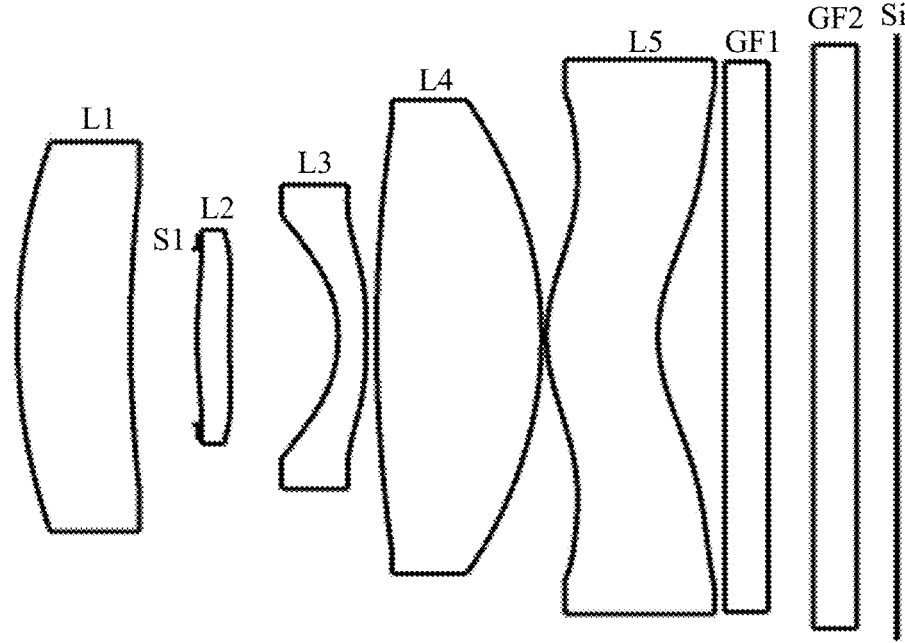
FIG. 5 is a schematic diagram of a structure of a camera optical lens according to Embodiment 2 of the present disclosure.

FIG. 5 is a camera optical lens 20 according to Embodiment 2 of the present disclosure.

Table 5 and Table 6 show design data of a camera optical lens 20 in Embodiment 2 of the present disclosure.

TABLE 5

|  | R |  | d |  | nd |  | vd |
|---|---|---|---|---|---|---|---|
| S1 | ∞ | d0= | −1.674 |  |  |  |  |
| R1 | 6.763 | d1= | 1.048 | nd1 | 2.1984 | v1 | 20.64 |
| R2 | 15.390 | d2= | 0.618 |  |  |  |  |
| R3 | 5.673 | d3= | 0.299 | nd2 | 1.6613 | v2 | 20.37 |
| R4 | 10.772 | d4= | 1.005 |  |  |  |  |
| R5 | −1.795 | d5= | 0.260 | nd3 | 1.6613 | v3 | 20.37 |
| R6 | −17.097 | d6= | 0.097 |  |  |  |  |
| R7 | 17.210 | d7= | 1.528 | nd4 | 2.1967 | v4 | 25.16 |
| R8 | −4.650 | d8= | 0.045 |  |  |  |  |
| R9 | 1.756 | d9= | 1.033 | nd5 | 1.5370 | v5 | 55.98 |
| R10 | 1.718 | d10= | 0.622 |  |  |  |  |
| R11 | ∞ | d11= | 0.400 | ndg1 | 1.5233 | vg1 | 54.52 |
| R12 | ∞ | d12= | 0.420 |  |  |  |  |
| R13 | ∞ | d13= | 0.400 | ndg2 | 1.5168 | vg2 | 64.17 |
| R14 | ∞ | d14= | 0.380 |  |  |  |  |

Table 6 shows aspherical surface data of each lens of the camera optical lens 20 in Embodiment 2 of the present disclosure.

TABLE 6

| | Conic coefficient | Aspherical surface coefficients | | | | |
|---|---|---|---|---|---|---|
| | k | A4 | A6 | A8 | A10 | A12 |
| R3 | −1.4617E+02 | 7.4573E−02 | −2.8855E−01 | 7.3578E−01 | −1.6599E+00 | 2.7142E+00 |
| R4 | −2.4675E+02 | −2.6948E−02 | −1.1529E−01 | 4.1030E−01 | −1.0996E+00 | 1.8509E+00 |
| R5 | −1.3647E+01 | −5.5776E−01 | 9.8063E−01 | −1.4217E+00 | 1.5859E+00 | −1.1972E+00 |
| R6 | 5.5768E+01 | −2.9621E−01 | 4.4592E−01 | −4.9065E−01 | 4.2854E−01 | −2.5605E−01 |
| R9 | −6.1285E+00 | 5.1312E−03 | −4.1717E−02 | 2.4938E−02 | −8.4732E−03 | 1.8720E−03 |
| R10 | −1.4019E+00 | −7.1721E−02 | 1.1375E−02 | −9.0791E−05 | −4.1558E−04 | 1.0868E−04 |

| | Conic coefficient | Aspherical surface coefficients | | | |
|---|---|---|---|---|---|
| | k | A14 | A16 | A18 | A20 |
| R3 | −1.4617E+02 | −2.9637E+00 | 2.0259E+00 | −7.8282E−01 | 1.2614E−01 |
| R4 | −2.4675E+02 | −1.9342E+00 | 1.2147E+00 | −4.2032E−01 | 5.8920E−02 |
| R5 | −1.3647E+01 | 5.7650E−01 | −1.6527E−01 | 2.4115E−02 | −1.3543E−03 |
| R6 | 5.5768E+01 | 9.8144E−02 | −2.2999E−02 | 2.9733E−03 | −1.5947E−04 |
| R9 | −6.1285E+00 | −2.6923E−04 | 2.4251E−05 | −1.2506E−06 | 2.8092E−08 |
| R10 | −1.4019E+00 | −1.3844E−05 | 9.7543E−07 | −3.7236E−08 | 4.9189E−10 |

Table 7 and Table 8 show design data of inflexion points and arrest points of lenses of the camera optical lens 20 according to Embodiment 2 of the present disclosure.

TABLE 7

| | Inflexion point number | Inflexion point position 1 | Inflexion point position 2 | Inflexion point position 3 |
|---|---|---|---|---|
| P1R1 | 0 | / | / | / |
| P1R2 | 0 | / | / | / |

TABLE 7-continued

| | Inflexion point number | Inflexion point position 1 | Inflexion point position 2 | Inflexion point position 3 |
|---|---|---|---|---|
| P2R1 | 1 | 0.565 | / | / |
| P2R2 | 1 | 0.355 | / | / |
| P3R1 | 0 | / | / | / |
| P3R2 | 1 | 0.915 | / | / |
| P4R1 | 0 | / | / | / |
| P4R2 | 0 | / | / | / |
| P5R1 | 1 | 0.785 | / | / |
| P5R2 | 3 | 0.915 | 2.085 | 2.475 |

TABLE 8

| | Arrest point number | Arrest point position 1 |
|---|---|---|
| P1R1 | 0 | / |
| P1R2 | 0 | / |
| P2R1 | 1 | 0.885 |
| P2R2 | 1 | 0.595 |
| P3R1 | 0 | / |
| P3R2 | 1 | 1.405 |
| P4R1 | 0 | / |
| P4R2 | 0 | / |
| P5R1 | 1 | 1.675 |
| P5R2 | 1 | 2.685 |

Figure 6:
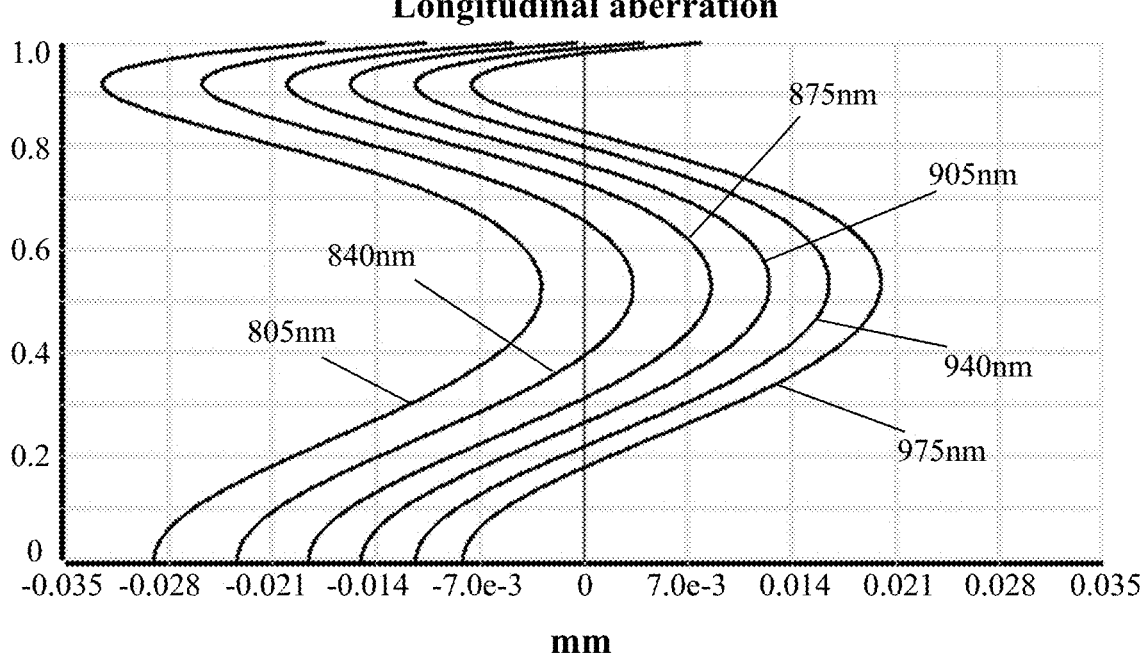
FIG. 6 is a schematic diagram of a longitudinal aberration of the camera optical lens shown in FIG. 5.
Figure 7:
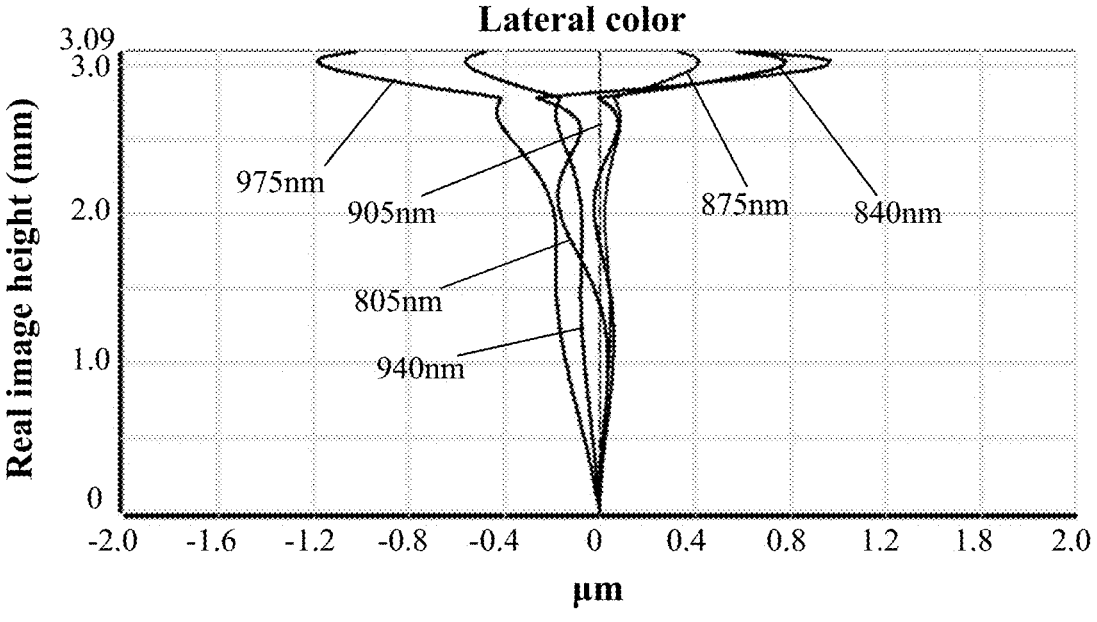
FIG. 7 is a schematic diagram of a lateral color of the camera optical lens shown in FIG. 5.
Figure 8:
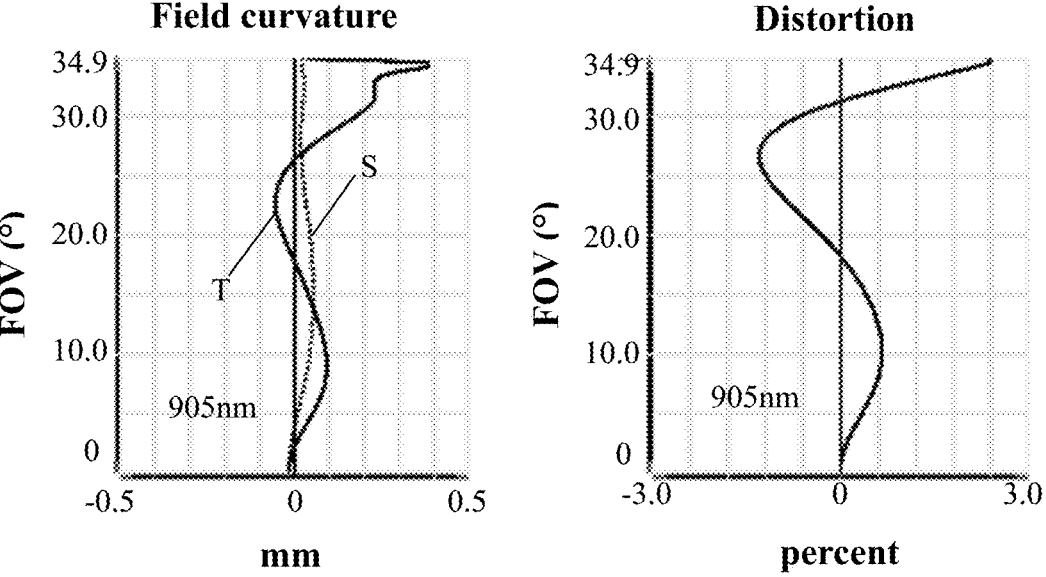
FIG. 8 is a schematic diagram of a field curvature and a distortion of the camera optical lens shown in FIG. 5.

FIG. 6 and FIG. 7 illustrate a longitudinal aberration and a lateral color of light with wavelengths of 805 nm, 840 nm, 875 nm, 905 nm, 940 nm and 975 nm after passing the camera optical lens 20 according to Embodiment 2. FIG. 8 illustrates a field curvature and a distortion of light with a wavelength of 905 nm after passing the camera optical lens 20 according to Embodiment 2. A field curvature S in FIG. 8 is a field curvature in a sagittal direction, and T is a field curvature in a tangential direction.

As shown in Table 21, Embodiment 2 satisfies the conditions.

In this embodiment, an entrance pupil diameter ENPD of the camera optical lens 20 is 2.106 mm, an image height IH of 1.0H is 3.0925 mm, and an FOV (field of view) in the diagonal direction is 69.67°. Thus, the camera optical lens 20 satisfies a design requirement of large aperture, ultra-thinness and fine temperature performance. Its on-axis and off-axis aberrations are fully corrected, thereby having excellent optical characteristics.

Embodiment 3

Embodiment 3 is basically the same as Embodiment 1 and involves symbols having the same meanings as Embodiment 1, and only differences therebetween will be described in the following.

In this embodiment, the fifth lens L3 has a negative refractive power.

Figure 9:
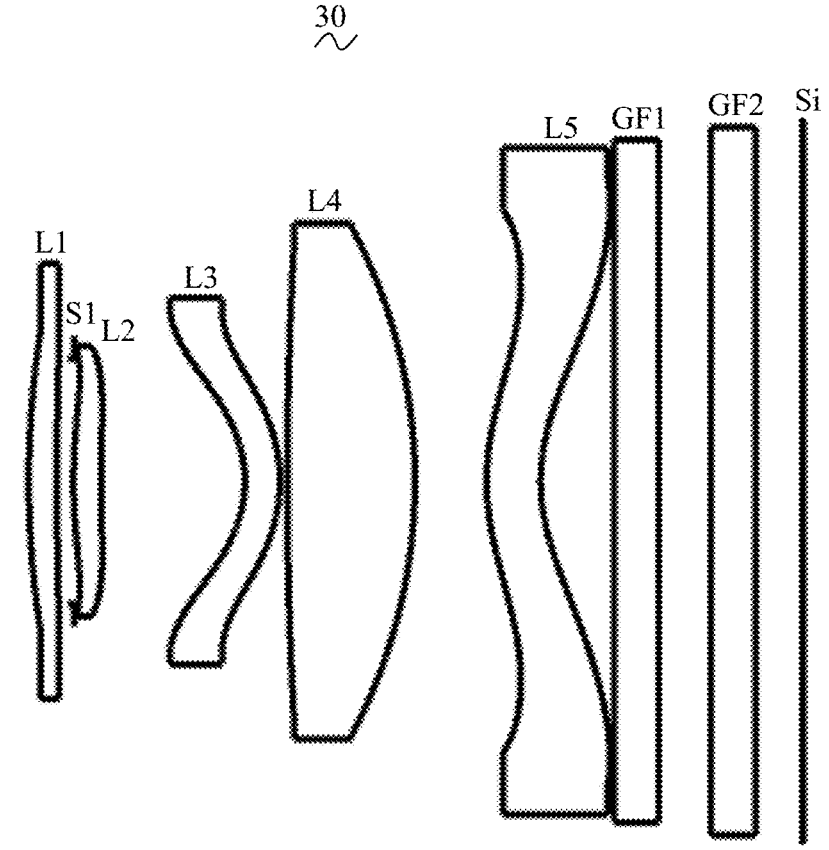
FIG. 9 is a schematic diagram of a structure of a camera optical lens according to Embodiment 3 of the present disclosure.

FIG. 9 is a camera optical lens 30 according to Embodiment 3 of the present disclosure.

Table 9 and Table 10 show design data of the camera optical lens 30 in Embodiment 3 of the present disclosure.

TABLE 9

|  | R |  | d |  | nd |  | vd |
|---|---|---|---|---|---|---|---|
| S1 | ∞ | d0= | −0.413 |  |  |  |  |
| R1 | 7.843 | d1= | 0.255 | nd1 | 1.7030 | v1 | 69.24 |
| R2 | 35.256 | d2= | 0.150 |  |  |  |  |
| R3 | 4.415 | d3= | 0.249 | nd2 | 1.6613 | v2 | 20.37 |
| R4 | 10.167 | d4= | 1.301 |  |  |  |  |
| R5 | −0.995 | d5= | 0.317 | nd3 | 1.6613 | v3 | 20.37 |
| R6 | −1.268 | d6= | 0.066 |  |  |  |  |
| R7 | 34.371 | d7= | 1.154 | nd4 | 1.7958 | v4 | 44.96 |
| R8 | −4.429 | d8= | 0.648 |  |  |  |  |
| R9 | 1.942 | d9= | 0.488 | nd5 | 1.5370 | v5 | 55.98 |
| R10 | 1.500 | d10= | 0.669 |  |  |  |  |
| R11 | ∞ | d11= | 0.400 | ndg1 | 1.5233 | vg1 | 54.52 |
| R12 | ∞ | d12= | 0.475 |  |  |  |  |
| R13 | ∞ | d13= | 0.400 | ndg2 | 1.5168 | vg2 | 64.17 |
| R14 | ∞ | d14= | 0.431 |  |  |  |  |

Table 10 shows aspherical surface data of each lens of the camera optical lens 30 in Embodiment 3 of the present disclosure.

TABLE 10

|  | Conic coefficient | Aspherical surface coefficients |  |  |  |  |
|---|---|---|---|---|---|---|
|  | k | A4 | A6 | A8 | A10 | A12 |
| R3 | −7.4992E+01 | 8.3439E−02 | −2.9313E−01 | 7.2916E−01 | −1.6636E+00 | 2.7132E+00 |
| R4 | −1.0108E+02 | −2.4942E−02 | −1.1957E−01 | 4.0622E−01 | −1.1011E+00 | 1.8512E+00 |
| R5 | −5.6744E+00 | −5.6592E−01 | 9.9427E−01 | −1.4148E+00 | 1.5857E+00 | −1.1982E+00 |
| R6 | −6.7955E+00 | −3.2717E−01 | 4.5283E−01 | −4.8649E−01 | 4.2923E−01 | −2.5611E−01 |
| R9 | −7.3418E+00 | 2.4001E−02 | −4.5053E−02 | 2.4771E−02 | −8.4621E−03 | 1.8752E−03 |
| R10 | −1.9009E+00 | −5.1988E−02 | 9.0438E−03 | −1.2767E−04 | −4.0945E−04 | 1.0895E−04 |

|  | Conic coefficient | Aspherical surface coefficients |  |  |  |
|---|---|---|---|---|---|
|  | k | A14 | A16 | A18 | A20 |
| R3 | −7.4992E+01 | −2.9629E+00 | 2.0278E+00 | −7.8053E−01 | 1.2797E−01 |
| R4 | −1.0108E+02 | −1.9335E+00 | 1.2155E+00 | −4.1923E−01 | 6.0402E−02 |
| R5 | −5.6744E+00 | 5.7612E−01 | −1.6515E−01 | 2.4344E−02 | −1.2128E−03 |
| R6 | −6.7955E+00 | 9.8035E−02 | −2.3048E−02 | 2.9659E−03 | −1.5157E−04 |
| R9 | −7.3418E+00 | −2.6889E−04 | 2.4221E−05 | −1.2587E−06 | 2.7676E−08 |
| R10 | −1.9009E+00 | −1.3886E−05 | 9.6943E−07 | −3.7896E−08 | 7.4150E−10 |

Table 11 and Table 12 show design data of inflexion points and arrest points of lenses of the camera optical lens 30 according to Embodiment 3 of the present disclosure.

TABLE 11

|  | Inflexion point number | Inflexion point position 1 |
|---|---|---|
| P1R1 | 0 | / |
| P1R2 | 0 | / |

TABLE 11-continued

|  | Inflexion point number | Inflexion point position 1 |
|---|---|---|
| P2R1 | 1 | 0.595 |
| P2R2 | 1 | 0.385 |
| P3R1 | 1 | 0.905 |
| P3R2 | 1 | 0.925 |
| P4R1 | 0 | / |
| P4R2 | 0 | / |
| P5R1 | 1 | 0.875 |
| P5R2 | 1 | 1.025 |

TABLE 12

|  | Arrest point number | Arrest point position 1 |
|---|---|---|
| P1R1 | 0 | / |
| P1R2 | 0 | / |
| P2R1 | 1 | 0.905 |
| P2R2 | 1 | 0.625 |
| P3R1 | 0 | / |
| P3R2 | 1 | 1.495 |
| P4R1 | 0 | / |
| P4R2 | 0 | / |
| P5R1 | 1 | 1.715 |
| P5R2 | 1 | 2.385 |

Figure 10:
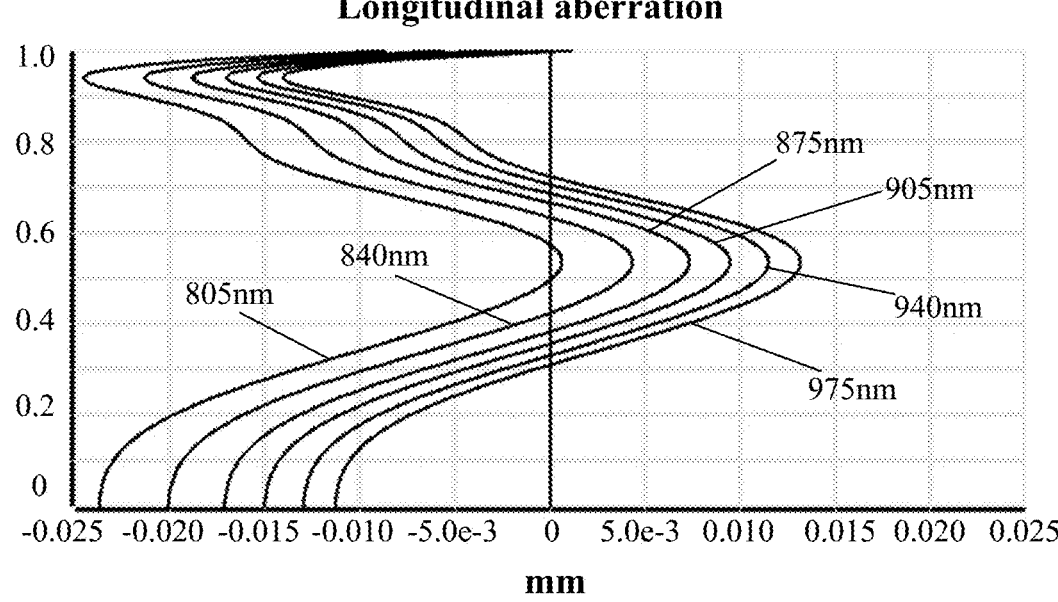
FIG. 10 is a schematic diagram of a longitudinal aberration of the camera optical lens shown in FIG. 9.
Figure 11:
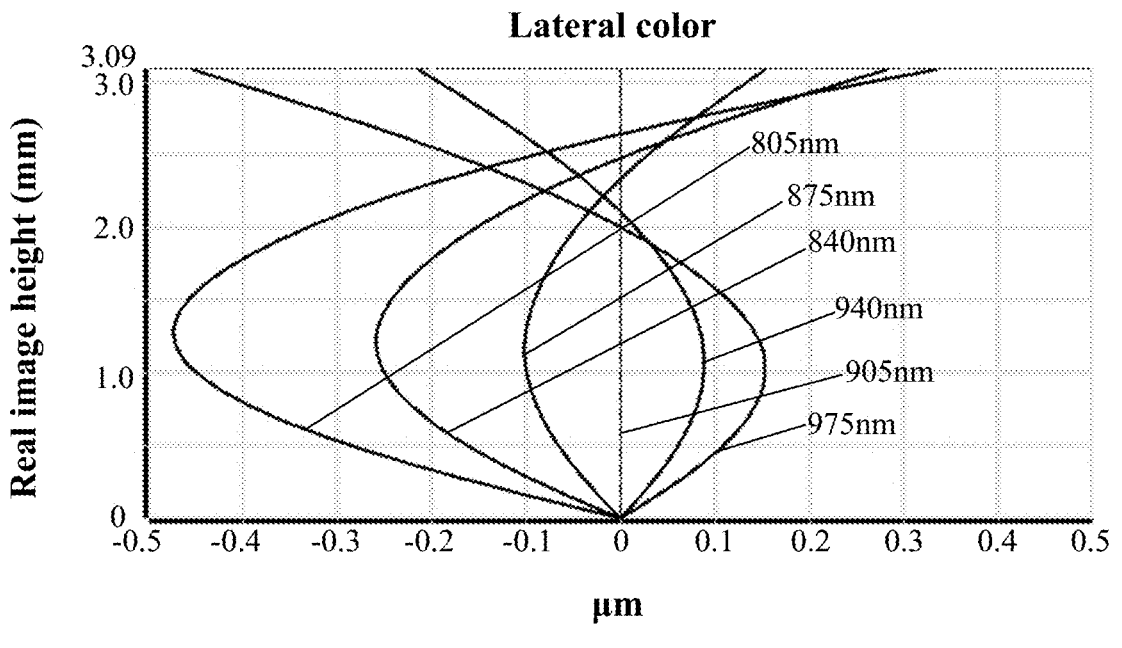
FIG. 11 is a schematic diagram of a lateral color of the camera optical lens shown in FIG. 9.
Figure 12:
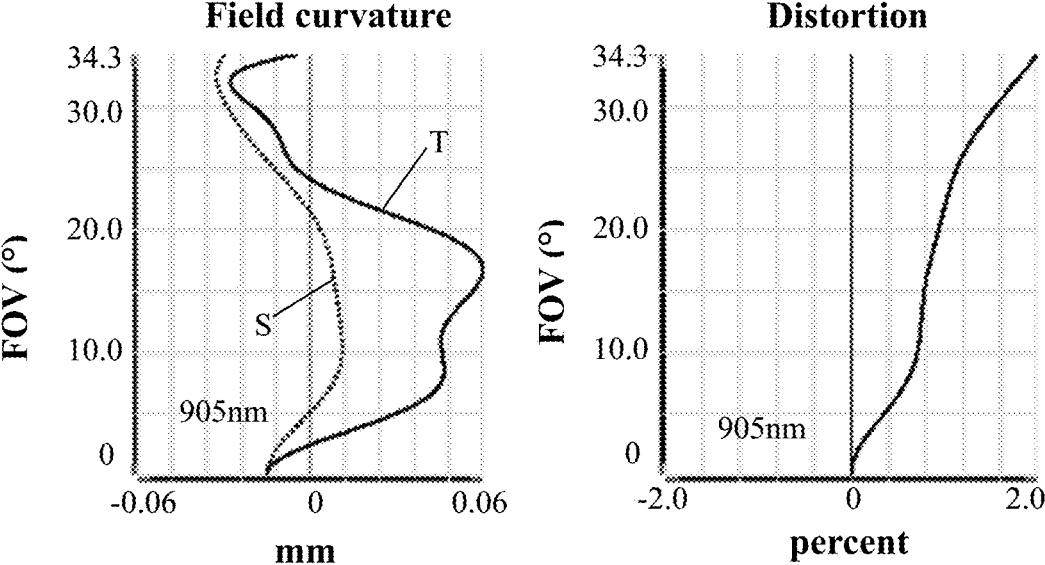
FIG. 12 is a schematic diagram of a field curvature and a distortion of the camera optical lens shown in FIG. 9.

FIG. 10 and FIG. 11 illustrate a longitudinal aberration and a lateral color of light with wavelengths of 805 nm, 840 nm, 875 nm, 905 nm, 940 nm and 975 nm after passing the camera optical lens 30 according to Embodiment 3. FIG. 12 illustrates a field curvature and a distortion of light with a wavelength of 905 nm after passing the camera optical lens 30 according to Embodiment 3. A field curvature S in FIG. 12 is a field curvature in a sagittal direction, and T is a field curvature in a tangential direction.

Table 21 in the following lists values corresponding to the respective conditions in this embodiment according to the above conditions. Obviously, the camera optical lens 30 in this embodiment does not satisfy the above conditions.

In an embodiment, an entrance pupil diameter ENPD of the camera optical lens 30 is 2.152 mm, an image height IH of 1.0H is 3.0925 mm, and an FOV (field of view) in the diagonal direction is 68.63°. Thus, the camera optical lens 30 satisfies a design requirement of large aperture, ultra-thinness and fine temperature performance. Its on-axis and off-axis aberrations are fully corrected, thereby having excellent optical characteristics.

Embodiment 4

Embodiment 4 is basically the same as Embodiment 1 and involves symbols having the same meanings as Embodiment 1, and only differences therebetween will be described in the following.

Figure 13:
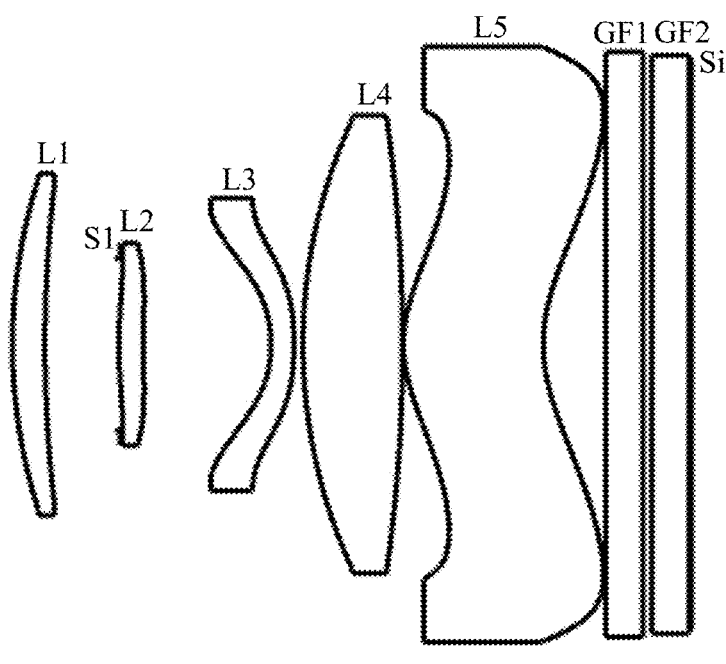
FIG. 13 is a schematic diagram of a structure of a camera optical lens according to Embodiment 4 of the present disclosure.

FIG. 13 is a camera optical lens 40 according to Embodiment 4 of the present disclosure.

Table 13 and Table 14 show design data of the camera optical lens 40 in Embodiment 4 of the present disclosure.

TABLE 13

|     | R      | d    |       | nd     |     | vd    |
| --- | ------ | ---- | ----- | ------ | --- | ----- |
| S1  | ∞      | d0=  | −1.151|        |     |       |
| R1  | 6.031  | d1=  | 0.348 | nd1    | 1.8830 v1 | 39.23 |
| R2  | 14.912 | d2=  | 0.794 |        |     |       |
| R3  | 5.695  | d3=  | 0.265 | nd2    | 1.6613 v2 | 20.37 |
| R4  | 25.468 | d4=  | 1.369 |        |     |       |
| R5  | −1.403 | d5=  | 0.245 | nd3    | 1.6613 v3 | 20.37 |
| R6  | −3.881 | d6=  | 0.097 |        |     |       |
| R7  | 5.970  | d7=  | 1.070 | nd4    | 1.7126 v4 | 42.69 |
| R8  | −17.912| d8=  | 0.006 |        |     |       |
| R9  | 1.352  | d9=  | 1.502 | nd5    | 1.5370 v5 | 55.98 |
| R10 | 1.724  | d10= | 0.672 |        |     |       |
| R11 | ∞      | d11= | 0.400 | ndg1   | 1.5233 vg1 | 54.52 |
| R12 | ∞      | d12= | 0.094 |        |     |       |
| R13 | ∞      | d13= | 0.400 | ndg2   | 1.5168 vg2 | 64.17 |
| R14 | ∞      | d14= | 0.029 |        |     |       |

Table 14 shows aspherical surface data of each lens of the camera optical lens 40 in Embodiment 4 of the present disclosure.

TABLE 14

|     | Conic coefficient | Aspherical surface coefficients | | | | |
| --- | --- | --- | --- | --- | --- | --- |
|     | k | A4 | A6 | A8 | A10 | A12 |
| R3  | −1.3547E+02 | 7.9873E−02 | −2.8879E−01 | 7.2719E−01 | −1.6617E+00 | 2.7150E+00 |
| R4  | 5.5270E+02 | −2.2898E−02 | −1.3099E−01 | 4.1153E−01 | −1.0946E+00 | 1.8501E+00 |
| R5  | −9.9374E+00 | −5.9683E−01 | 9.9577E−01 | −1.4131E+00 | 1.5836E+00 | −1.1981E+00 |
| R6  | 2.9929E+00 | −3.1856E−01 | 4.4716E−01 | −4.8857E−01 | 4.2963E−01 | −2.5579E−01 |
| R9  | −5.7485E+00 | 2.3746E−02 | −4.2531E−02 | 2.4421E−02 | −8.4378E−03 | 1.8734E−03 |
| R10 | −1.2144E+00 | −5.9580E−02 | 9.9855E−03 | −1.9884E−04 | −4.1407E−04 | 1.0970E−04 |

|     | Conic coefficient | Aspherical surface coefficients | | | |
| --- | --- | --- | --- | --- | --- |
|     | k | A14 | A16 | A18 | A20 |
| R3  | −1.3547E+02 | −2.9611E+00 | 2.0294E+00 | −7.8240E−01 | 1.2558E−01 |
| R4  | 5.5270E+02 | −1.9376E+00 | 1.2148E+00 | −4.1726E−01 | 5.8395E−02 |
| R5  | −9.9374E+00 | 5.7631E−01 | −1.6500E−01 | 2.4385E−02 | −1.2519E−03 |
| R6  | 2.9929E+00 | 9.8132E−02 | −2.3043E−02 | 2.9518E−03 | −1.5175E−04 |
| R9  | −5.7485E+00 | −2.7120E−04 | 2.4631E−05 | −1.2199E−06 | 2.0531E−08 |
| R10 | −1.2144E+00 | −1.3841E−05 | 9.6847E−07 | −3.8352E−08 | 7.2515E−10 |

Table 15 and Table 16 show design data of inflexion points and arrest points of lenses of the camera optical lens 40 according to Embodiment 4 of the present disclosure.

TABLE 15

|     | Inflexion point number | Inflexion point position 1 |
| --- | --- | --- |
| P1R1 | 0 | / |
| P1R2 | 0 | / |
| P2R1 | 1 | 0.575 |
| P2R2 | 1 | 0.305 |

TABLE 15-continued

|     | Inflexion point number | Inflexion point position 1 |
| --- | --- | --- |
| P3R1 | 1 | 0.965 |
| P3R2 | 1 | 1.035 |
| P4R1 | 0 | / |
| P4R2 | 0 | / |
| P5R1 | 1 | 0.905 |
| P5R2 | 1 | 1.135 |

TABLE 16

|     | Arrest point number | Arrest point position 1 |
| --- | --- | --- |
| P1R1 | 0 | / |
| P1R2 | 0 | / |
| P2R1 | 1 | 0.885 |
| P2R2 | 1 | 0.485 |
| P3R1 | 0 | / |
| P3R2 | 1 | 1.575 |
| P4R1 | 0 | / |
| P4R2 | 0 | / |
| P5R1 | 1 | 2.035 |
| P5R2 | 1 | 2.525 |

Figure 14:
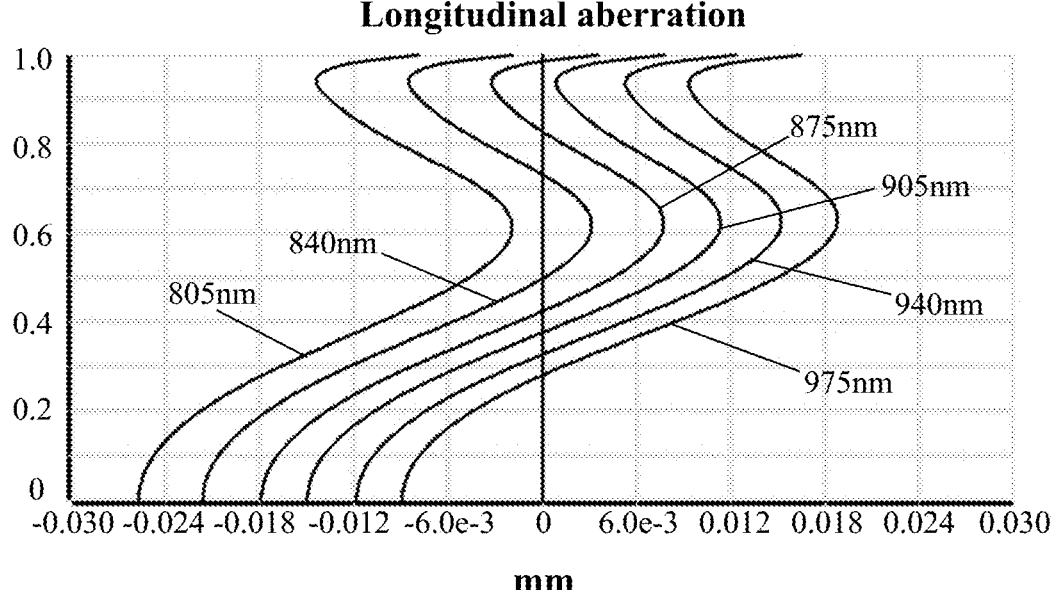
FIG. 14 is a schematic diagram of a longitudinal aberration of the camera optical lens shown in FIG. 13.
Figure 15:
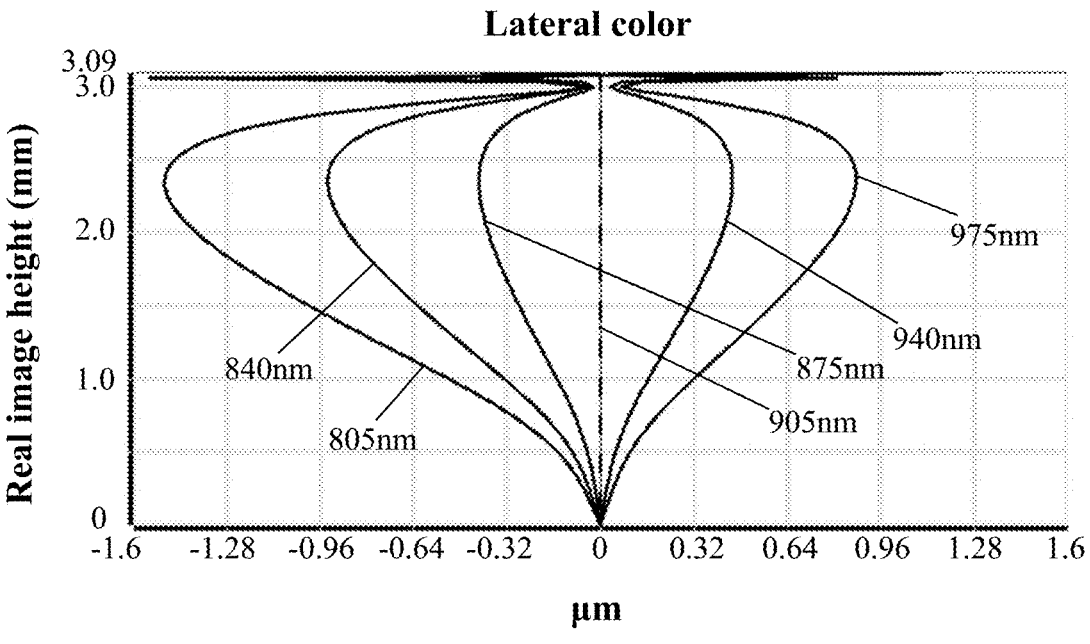
FIG. 15 is a schematic diagram of a lateral color of the camera optical lens shown in FIG. 13.
Figure 16:
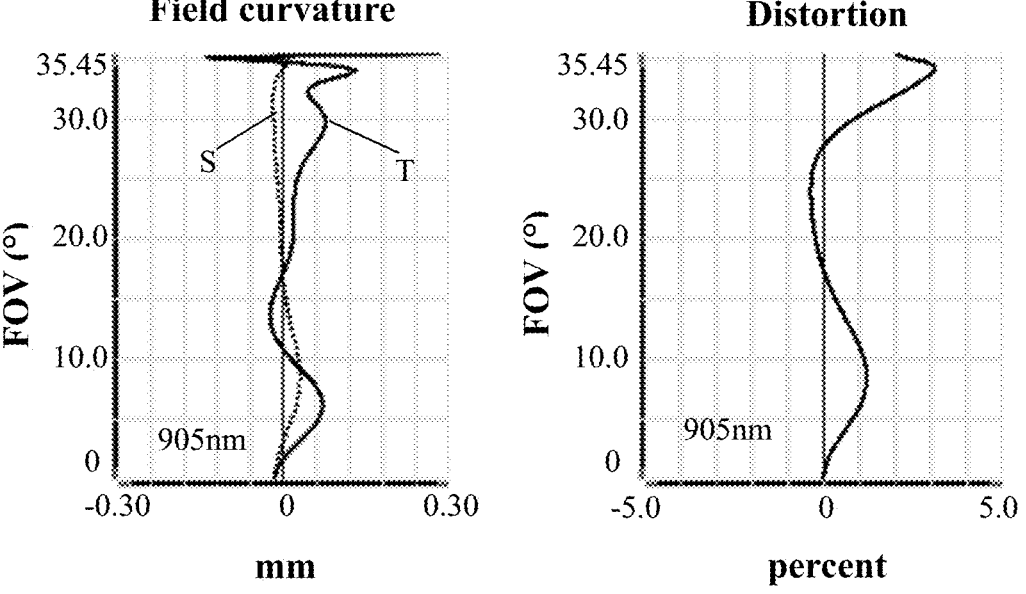
FIG. 16 is a schematic diagram of a field curvature and a distortion of the camera optical lens shown in FIG. 13.

FIG. 14 and FIG. 15 illustrate a longitudinal aberration and a lateral color of light with wavelengths of 805 nm, 840 nm, 875 nm, 905 nm, 940 nm and 975 nm after passing the camera optical lens 40 according to Embodiment 4. FIG. 16 illustrates a field curvature and a distortion of light with a wavelength of 905 nm after passing the camera optical lens 40 according to Embodiment 4. A field curvature S in FIG. 16 is a field curvature in a sagittal direction, and T is a field curvature in a tangential direction.

Table 21 in the following lists values corresponding to the respective conditions in this embodiment according to the above conditions. Obviously, the camera optical lens 40 in this embodiment does not satisfy the above conditions.

In this embodiment, an entrance pupil diameter ENPD of the camera optical lens 40 is 2.059 mm, an image height IH of 1.0H is 3.0925 mm, and an FOV (field of view) in the diagonal direction is 70.90°. Thus, the camera optical lens 40 satisfies a design requirement of large aperture, ultra-thinness and fine temperature performance. Its on-axis and off-axis aberrations are fully corrected, thereby having excellent optical characteristics.

Contrasting Embodiment

The contrasting embodiment involves symbols having the same meanings as Embodiment 1, and only differences therebetween will be described in the following.

In the contrasting embodiment, the first lens L1 is plastic.

Figure 17:
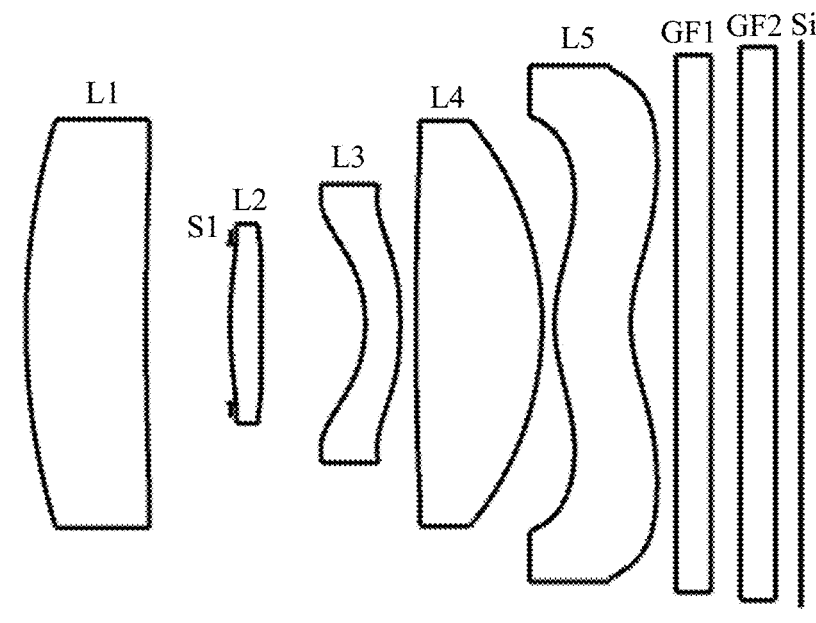
FIG. 17 is a schematic diagram of a structure of a camera optical lens according to a contrasting embodiment.

FIG. 17 is a camera optical lens 50 according to the contrasting embodiment.

Table 17 and Table 18 show design data of a camera optical lens 50 in the contrasting embodiment of the present disclosure.

TABLE 17

|    | R      |      | d      | nd     |     | vd    |
|----|--------|------|--------|--------|-----|-------|
| S1 | ∞      | d0=  | −2.348 |        |     |       |
| R1 | 7.625  | d1=  | 1.377  | nd1    | 1.6700 v1 | 19.39 |
| R2 | 47.041 | d2=  | 0.963  |        |     |       |
| R3 | 4.153  | d3=  | 0.353  | nd2    | 1.6613 v2 | 20.37 |
| R4 | 16.408 | d4=  | 1.195  |        |     |       |
| R5 | −1.724 | d5=  | 0.400  | nd3    | 1.6613 v3 | 20.37 |
| R6 | −4.968 | d6=  | 0.180  |        |     |       |
| R7 | 41.254 | d7=  | 1.446  | nd4    | 1.8348 v4 | 42.73 |
| R8 | −3.461 | d8=  | 0.143  |        |     |       |
| R9 | 1.603  | d9=  | 0.873  | nd5    | 1.5370 v5 | 55.98 |
| R10| 1.503  | d10= | 0.520  |        |     |       |
| R11| ∞      | d11= | 0.400  | ndg1   | 1.5233 vg1 | 54.52 |
| R12| ∞      | d12= | 0.338  |        |     |       |
| R13| ∞      | d13= | 0.400  | ndg2   | 1.5168 vg2 | 64.17 |
| R14| ∞      | d14= | 0.298  |        |     |       |

Table 18 shows aspherical surface data of each lens of the camera optical lens 50 in the contrasting embodiment of the present disclosure.

TABLE 18

| | Conic coefficient | Aspherical surface coefficients | | | | |
|---|---|---|---|---|---|---|
| | k | A4 | A6 | A8 | A10 | A12 |
| R3 | −6.7044E+01 | 8.9574E−02 | −2.8909E−01 | 7.3304E−01 | −1.6614E+00 | 2.7147E+00 |
| R4 | −3.0313E+02 | −2.6138E−02 | −1.1477E−01 | 4.1042E−01 | −1.0990E+00 | 1.8524E+00 |
| R5 | −1.0936E+01 | −5.7229E−01 | 9.9768E−01 | −1.4182E+00 | 1.5843E+00 | −1.1978E+00 |
| R6 | −1.8452E+01 | −3.0014E−01 | 4.4360E−01 | −4.8983E−01 | 4.2910E−01 | −2.5592E−01 |
| R9 | −8.8353E+00 | 9.1810E−04 | −4.1281E−02 | 2.4862E−02 | −8.5509E−03 | 1.8744E−03 |
| R10 | −4.9667E+00 | −5.4483E−02 | 1.0318E−02 | −1.3031E−04 | −4.1476E−04 | 1.0772E−04 |

| | Conic coefficient | Aspherical surface coefficients | | | |
|---|---|---|---|---|---|
| | k | A14 | A16 | A18 | A20 |
| R3 | −6.7044E+01 | −2.9622E+00 | 2.0289E+00 | −7.7906E−01 | 1.3055E−01 |
| R4 | −3.0313E+02 | −1.9323E+00 | 1.2165E+00 | −4.1873E−01 | 6.0225E−02 |
| R5 | −1.0936E+01 | 5.7662E−01 | −1.6492E−01 | 2.4352E−02 | −1.2817E−03 |
| R6 | −1.8452E+01 | 9.8146E−02 | −2.3008E−02 | 2.9701E−03 | −1.5930E−04 |
| R9 | −8.8353E+00 | −2.6783E−04 | 2.4380E−05 | −1.2679E−06 | 1.4444E−08 |
| R10 | −4.9667E+00 | −1.4020E−05 | 9.6715E−07 | −3.6751E−08 | 7.9976E−10 |

Table 19 and Table 20 show design data of inflexion points and arrest points of lenses of the camera optical lens 50 according to the contrasting embodiment of the present disclosure.

TABLE 19

| | Inflexion point number | Inflexion point position 1 | Inflexion point position 1 |
|---|---|---|---|
| P1R1 | 0 | / | / |
| P1R2 | 0 | / | / |

TABLE 19-continued

| | Inflexion point number | Inflexion point position 1 | Inflexion point position 1 |
|---|---|---|---|
| P2R1 | 2 | 0.655 | 0.905 |
| P2R2 | 2 | 0.325 | 1.015 |
| P3R1 | 1 | 0.925 | / |
| P3R2 | 1 | 0.935 | / |
| P4R1 | 0 | / | / |
| P4R2 | 0 | / | / |
| P5R1 | 1 | 0.695 | / |
| P5R2 | 1 | 0.715 | / |

TABLE 20

| | Arrest point number | Arrest point position 1 |
|---|---|---|
| P1R1 | 0 | / |
| P1R2 | 0 | / |
| P2R1 | 0 | / |
| P2R2 | 1 | 0.535 |
| P3R1 | 0 | / |
| P3R2 | 1 | 1.395 |
| P4R1 | 0 | / |
| P4R2 | 0 | / |
| P5R1 | 1 | 1.405 |
| P5R2 | 1 | 1.765 |

Figure 18:
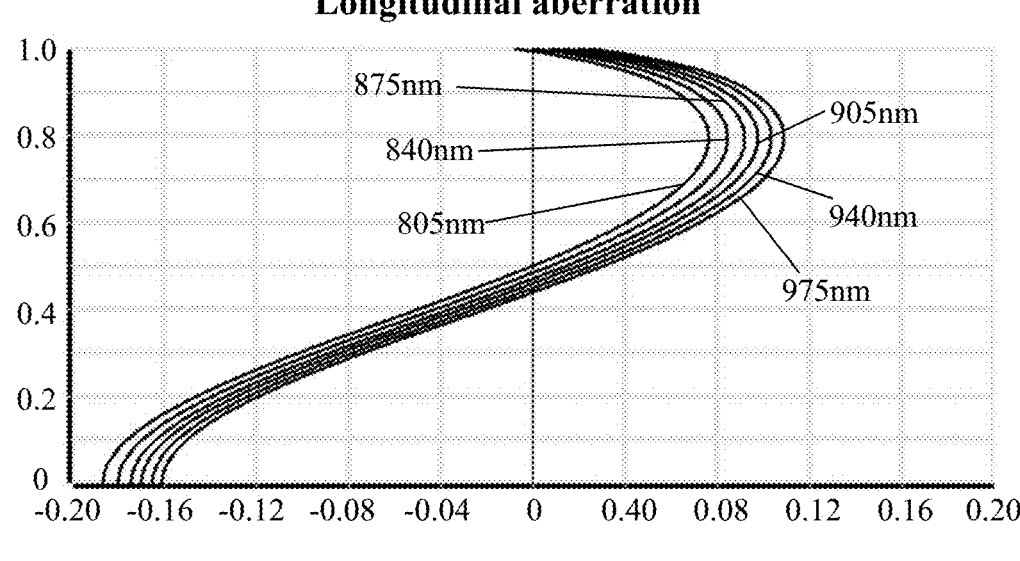
FIG. 18 is a schematic diagram of a longitudinal aberration of the camera optical lens shown in FIG. 17.
Figure 19:
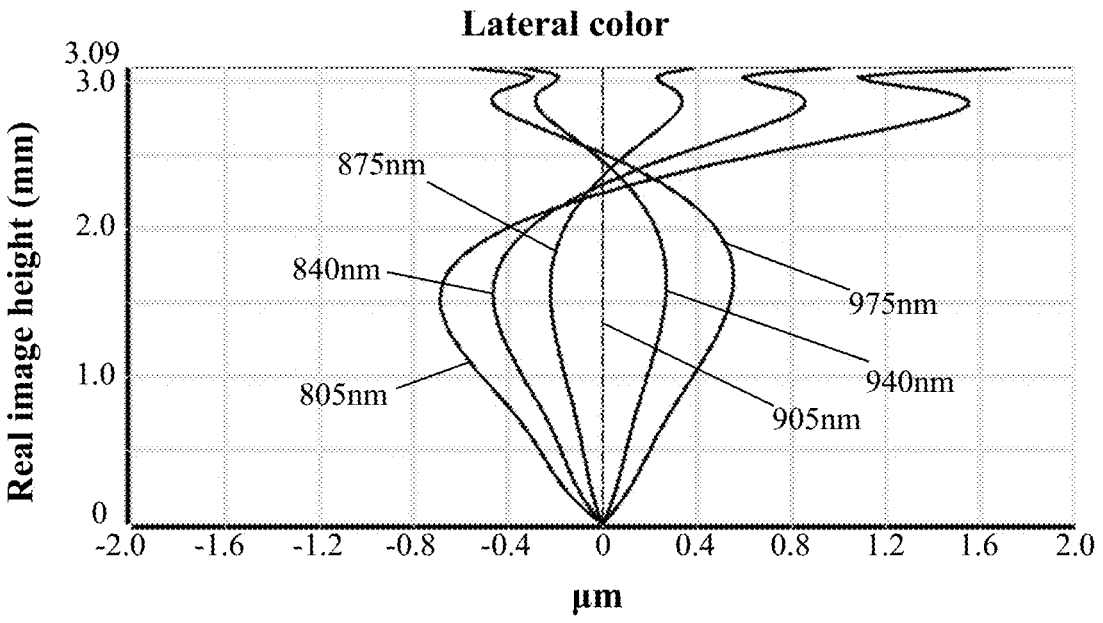
FIG. 19 is a schematic diagram of a lateral color of the camera optical lens shown in FIG. 17.
Figure 20:
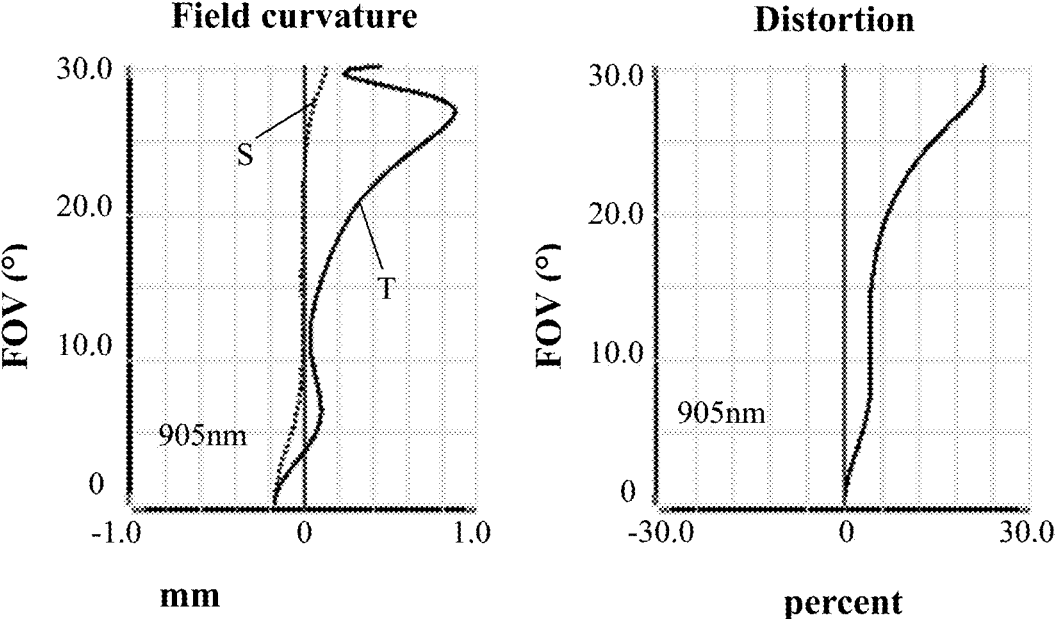
FIG. 20 is a schematic diagram of a field curvature and a distortion of the camera optical lens shown in FIG. 17.

FIG. 18 and FIG. 19 illustrate a longitudinal aberration and a lateral color of light with wavelengths of 805 nm, 840 nm, 875 nm, 905 nm, 940 nm and 975 nm after passing the camera optical lens 50 according to the contrasting embodi-ment. FIG. 20 illustrates a field curvature and a distortion of light with a wavelength of 905 nm after passing the camera optical lens 50 according to the contrasting embodiment. A field curvature S in FIG. 20 is a field curvature in a sagittal direction, and T is a field curvature in a tangential direction.

Table 21 in the following lists values corresponding to the respective conditions in the contrasting embodiment accord-ing to the above conditions. The first lens in the camera optical lens 50 in the contrasting embodiment is plastic, which does not satisfy the condition of $1.70 \leq n1 \leq 2.20$.

In the contrasting embodiment, an entrance pupil diameter ENPD of the camera optical lens 50 is 2.048 mm, an image height IH of 1.0H is 3.0925 mm, and an FOV (field of view) in the diagonal direction is 60.61°. On-axis and off-axis aberrations of the camera optical lens 50 are not fully corrected.

TABLE 21

| Parameters and conditions | Embodiment 1 | Embodiment 2 | Embodiment 3 | Embodiment 4 | Contrasting Embodiment |
|---|---|---|---|---|---|
| n1 | 1.88 | 2.20 | 1.70 | 1.88 | 1.67 |
| R5/R6 | 0.37 | 0.11 | 0.78 | 0.36 | 0.35 |
| f4/f | 0.94 | 0.76 | 1.15 | 1.55 | 0.94 |
| d2/d3 | 1.86 | 2.06 | 0.60 | 3.00 | 2.73 |
| f | 4.650 | 4.317 | 4.412 | 4.221 | 4.198 |
| f1 | 10.808 | 9.831 | 14.371 | 11.524 | 13.947 |
| f2 | 13.299 | 18.408 | 12.059 | 11.466 | 8.639 |
| f3 | −4.015 | −3.173 | −13.201 | −3.589 | −4.357 |
| f4 | 4.375 | 3.261 | 5.055 | 6.543 | 3.964 |
| f5 | 17.522 | 17.889 | −20.204 | 4.944 | 22.517 |
| FNO | 2.050 | 2.050 | 2.050 | 2.050 | 2.050 |
| TTL | 7.977 | 8.155 | 7.003 | 7.291 | 8.887 |

It can be appreciated by one having ordinary skill in the art that the description above is only embodiments of the present disclosure. In practice, one having ordinary skill in the art can make various modifications to these embodiments in forms and details without departing from the scope of the present disclosure.

What is claimed is:

1. A camera optical lens comprising, from an object side to an image side:

a first lens having a positive refractive power;

a second lens having a positive refractive power;

a third lens having a negative refractive power;

a fourth lens having a positive refractive power; and a fifth lens having a refractive power;

the first lens and the fourth lens being glass;

wherein the camera optical lens satisfies following conditions:

$$1.70 \le n1 \le 2.20;$$

$$0.10 \le R5/R6 \le 0.90;$$

$$0.75 \le f4/f \le 1.55; \text{and}$$

$$0.60 \le d2/d3 \le 3.00$$

where n1 denotes a refractive index of the first lens,

R5 denotes a central curvature radius of an object-side surface of the third lens;

R6 denotes a central curvature radius of an image-side surface of the third lens;

f denotes a focal length of the camera optical lens;

f4 denotes a focal length of the fourth lens;

d2 denotes an on-axis distance from an image-side surface of the first lens to an object-side surface of the second lens; and d3 denotes an on-axis thickness of the second lens.

2. The camera optical lens according to claim 1 further satisfying following condition:

$$0.90 \le R9/d9 \le 4.00;$$

where

R9 denotes a central curvature radius of the object-side surface of the fifth lens; and d9 denotes an on-axis thickness of the fifth lens.

3. The camera optical lens according to claim 1 further satisfying following condition:

$$1.70 \le n4 \le 2.20;$$

where n4 denotes a refractive index of the fourth lens.

4. The camera optical lens according to claim 1, wherein an operation wavelength of the camera optical lens is 805 nm to 975 nm.

5. The camera optical lens according to claim 1, wherein an operation temperature range of the camera optical lens is −40° C. to 85° C.

6. The camera optical lens according to claim 1, wherein an object-side surface of the first lens is convex in a paraxial region and the image-side surface of the first lens is concave in the paraxial region; and the camera optical lens further satisfies following conditions:

$$1.14 \le f1/f \le 4.89;$$

$$-5.14 \le (R1 + R2)/(R1 - R2) \le -1.05; \text{and}$$

$$0.02 \le d1/TTL \le 0.19$$

where f1 denotes a focal length of the first lens;

R1 denotes a central curvature radius of the object-side surface of the first lens;

R2 denotes a central curvature radius of the image-side surface of the first lens;

d1 denotes an on-axis thickness of the first lens; and

TTL denotes a total optical length from the object-side surface of the first lens to an image surface of the camera optical lens along an optical axis.

7. The camera optical lens according to claim 1, wherein an object-side surface of the second lens is convex in a paraxial region and an image-side surface of the second lens is concave in the paraxial region; and the camera optical lens further satisfies following conditions:

$$1.36 \le f2/f \le 6.40;$$

$$-6.45 \le (R3 + R4)/(R3 - R4) \le -1.05; \text{ and}$$

$$0.02 \le d3/TTL \le 0.06$$

where f2 denotes a focal length of the second lens;

R3 denotes a central curvature radius of the object-side surface of the second lens;

R4 denotes a central curvature radius of the image-side surface of the second lens; and TTL denotes a total optical length from an object-side surface of the first lens to an image surface of the camera optical lens along an optical axis.

8. The camera optical lens according to claim 1, wherein the object-side surface of the third lens is concave in a paraxial region and the image-side surface of the third lens is convex in the paraxial region; and the camera optical lens further satisfies following conditions:

$$-5.89 \le f3/f \le -0.49;$$

$$-16.58 \le (R5 + R6)/(R5 - R6) \le -0.82; \text{ and}$$

$$0.02 \le d5/TTL \le 0.07$$

where f3 denotes a focal length of the third lens;

d5 denotes an on-axis thickness of the third lens; and

TTL denotes a total optical length from an object-side surface of the first lens to an image surface of the camera optical lens along an optical axis.

9. The camera optical lens according to claim 1, wherein an object-side surface of the fourth lens is convex in a paraxial region and an image-side surface of the fourth lens is convex in the paraxial region; and the camera optical lens further satisfies following conditions:

$$-1.00 \le (R7 + R8)/(R7 - R8) \le 1.45;$$

$$\text{and } 0.07 \le d7/TTL \le 0.28;$$

where

R7 denotes a central curvature radius of the object-side surface of the fourth lens;

R8 denotes a central curvature radius of the image-side surface of the fourth lens;

d7 denotes an on-axis thickness of the fourth lens; and

TTL denotes a total optical length from an object-side surface of the first lens to an image surface of the camera optical lens along an optical axis.

10. The camera optical lens according to claim 1, wherein an object-side surface of the fifth lens is convex in a paraxial region and an image-side surface of the fifth lens is concave in the paraxial region, and the camera optical lens further satisfies following conditions:

$$-9.16 \le f5/f \le 6.22;$$

$$-16.54 \le (R9 + R10)/(R9 - R10) \le 137.13;$$

$$\text{and } 0.03 \le d9/TTL \le 0.31;$$

where f5 denotes a focal length of the fifth lens;

R9 denotes a central curvature radius of the object-side surface of the fifth lens;

R10 denotes a central curvature radius of the image-side surface of the fifth lens;

d9 denotes an on-axis thickness of the fifth lens; and

TTL denotes a total optical length from an object-side surface of the first lens to an image surface of the camera optical lens along an optical axis.

\* \* \* \* \*